United States Patent
Eguchi et al.

(10) Patent No.: US 8,349,992 B2
(45) Date of Patent: Jan. 8, 2013

(54) THERMOSETTING RESIN HAVING BENZOXAZINE STRUCTURE AND METHOD FOR PRODUCING THE SAME

(75) Inventors: Yuji Eguchi, Tsukuba (JP); Kazuo Doyama, Tsukuba (JP)

(73) Assignee: Sekisui Chemical Co., Ltd., Osaka (JP)

( * ) Notice: Subject to any disclaimer, the term of this patent is extended or adjusted under 35 U.S.C. 154(b) by 164 days.

(21) Appl. No.: 12/668,374

(22) PCT Filed: Jul. 10, 2008

(86) PCT No.: PCT/JP2008/062457
§ 371 (c)(1),
(2), (4) Date: Jan. 8, 2010

(87) PCT Pub. No.: WO2009/008468
PCT Pub. Date: Jan. 15, 2009

(65) Prior Publication Data
US 2010/0204433 A1    Aug. 12, 2010

(30) Foreign Application Priority Data

Jul. 10, 2007  (JP) ................... 2007-180607
Sep. 26, 2007  (JP) ................... 2007-249922
Feb. 18, 2008  (JP) ................... 2008-036021

(51) Int. Cl.
*C08G 73/16* (2006.01)
(52) U.S. Cl. ............... 528/289; 528/94; 544/14
(58) Field of Classification Search .............. 528/94, 528/289; 544/14
See application file for complete search history.

(56) References Cited

U.S. PATENT DOCUMENTS

| | | | |
|---|---|---|---|
| 4,547,583 A | 10/1985 | Nestler | |
| 5,239,018 A * | 8/1993 | Yezrielev et al. | 525/418 |
| 5,536,794 A * | 7/1996 | Yezrielev et al. | 525/443 |

FOREIGN PATENT DOCUMENTS

| | | |
|---|---|---|
| GB | 1437814 A | 6/1976 |
| JP | 49-47378 A | 5/1974 |
| JP | 52-039646 A | 3/1977 |
| JP | 60-94941 A | 5/1985 |
| JP | 05-051350 A | 3/1993 |
| JP | 09-059334 A | 3/1997 |
| JP | 11-080302 A | 3/1999 |
| JP | 2000-154225 A | 6/2000 |
| JP | 2002-080425 A | 3/2002 |
| JP | 2002-338648 A | 11/2002 |
| JP | 2003-064180 A | 3/2003 |
| JP | 2004-059517 A | 2/2004 |
| JP | 2005-213301 A | 8/2005 |
| JP | 2005-239827 A | 9/2005 |
| JP | 2007-045862 A | 2/2007 |

OTHER PUBLICATIONS

Homepage of Konishi Chemical Ind. Co., Ltd. (retrieved on Nov. 24, 2005), on internet <URL:http://www.konishi-chem.co.jp/cgi-data/jp/pdf/pdf#2.pdf>.
Homepage of Konishi Chemical Ind. Co., Ltd. (retrieved on Sep. 18, 2007), on internet <URL:http://www.konishi-chem.co.jp/technology/oxazin.html>.
"Benzoxazine Monomers and Polymers: New Phenolic Resins by Ring-Opening Polymerization," J. P. Liu and H. Ishida, "The Polymeric Materials Encyclopedia," J. C. Salamone, Ed., (1996) pp. 484-494, CRC Press, Florida.
H. Y. Low and H. Ishida, "Structural effects of phenols on the thermal and thermo-oxidative degradation of polybenzoxazines", Polymer, (1999), pp. 4365-4376, vol. 40.
Nobuyuki Furukawa, et al., Harding Temperature and Heat-Resistance Properties of Benzoxazine Resin, Nihon Scchaku Gakkai shi, 2003, vol. 39, No. 11.
Joy Dunkers, et al., "Reaction of Benzoxazine-Based Phenolic Resins with Strong and Weak Carboxylic Acids and Phenols as Catalysts", Journal of Polymer Science: Part A, Polymer Chemistry, 1999, pp. 1913-1921, vol. 37.
Toshio Imai et al.; "The Current Polyimides—Fundamentals and Applications"; Edited by Japan Society of the Study of Polyimide; Jan. 28, 2002; pp. 516 to 524.

* cited by examiner

*Primary Examiner* — Shane Fang
(74) *Attorney, Agent, or Firm* — Sughrue Mion, PLLC

(57) ABSTRACT

The present invention provides a thermosetting resin having a benzoxazine ring structure represented by the following formula (I):

formula (I):

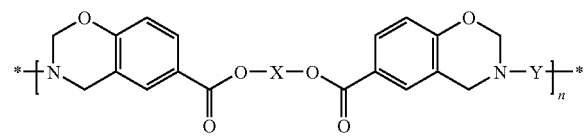

wherein X is a residue of a diol compound having a molecular weight or a number average molecular weight in terms of polystyrene measured by GPC of 5,000 or less; Y is a residue of a diamine compound; and n is an integer of 2 to 200.

20 Claims, No Drawings

THERMOSETTING RESIN HAVING BENZOXAZINE STRUCTURE AND METHOD FOR PRODUCING THE SAME

CROSS REFERENCE TO RELATED APPLICATION

This application is a National Stage of International Application No. PCT/JP2008/062457, filed Jul. 10, 2008, which claims priority to Japanese Patent Application Nos. 2007-180607, 2007-249922, and 2008-036021, filed Jul. 10, 2007, Sep. 26, 2007, and Feb. 18, 2008, respectively, the contents of all of which are incorporated herein by reference in their entirety.

TECHNICAL FIELD

The present invention relates to a thermosetting resin having a benzoxazine structure, that is excellent in heat resistance and satisfactory in electrical properties, and that is significantly improved in brittleness; a method for producing the thermosetting resin; a thermosetting composition comprising the thermosetting resin; molded articles, cured articles and cured molded articles of the thermosetting resin and the thermosetting composition; and electronic devices comprising these materials.

BACKGROUND ART

Thermosetting resins such as phenolic resin, melamine resin, epoxy resin, unsaturated polyester resin and bismaleimide resin are excellent, on the basis of the property referred to as thermosetting property, in the properties such as water resistance, chemical resistance, heat resistance, mechanical strength and reliability, and hence have hitherto been used in wide industrial fields.

However, there are, for example, the following disadvantages: phenolic resin and melamine resin generate volatile by-products at the time of curing, epoxy resin and unsaturated polyester resin are inferior in flame retardancy, and bismaleimide resin is extremely expensive.

For the purpose of overcoming these disadvantages, there have been studied benzoxazine compounds that undergo the ring-opening polymerization reaction of the benzoxazine rings, and that are thermally cured without evolving problematic volatile matter. Such benzoxazine compounds are disclosed, for example, in Patent Document 1.

As excellent benzoxazine compounds that are excellent in dimensional stability, low water absorption, low dielectric constant and heat resistance, and that do not evolve by-produced gases at the time of molding, the benzoxazine compounds represented by the following formula (1) and the following formula (2) are known (Non-Patent Documents 1 and 2):

formula (1):

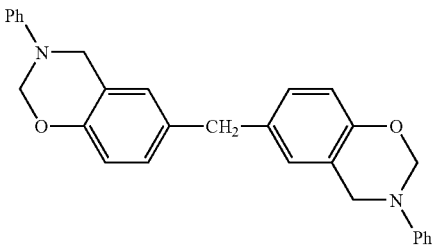

formula (2):

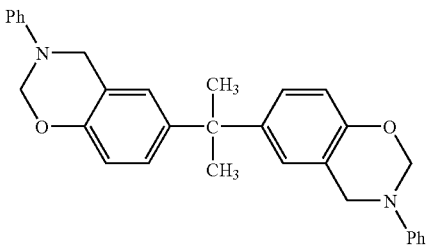

The resins obtained by the ring-opening polymerization of the benzoxazine rings of the benzoxazine compounds represented by the formulas (1) and (2) do not involve the evolution of volatile components at the time of thermosetting, and are also excellent in flame retardancy and mechanical properties.

Patent Document 2 discloses a thermosetting benzoxazine resin exhibiting flexibility and toughness, and being suitable for electronic parts and the like. However, the technique involved therein allows OH groups to be present in the skeleton of the thermosetting benzoxazine resin and hence the thermosetting benzoxazine resin is disadvantageous from the viewpoints of hygroscopicity and electrical properties.

Furthermore, Patent Document 3 discloses a curable resin having a dihydrobenzoxazine ring structure in the main chain thereof and being excellent in heat resistance and mechanical properties.

However, the curable resin includes highly polar groups such as a sulfone group and hence is thought to be probably disadvantageous from the viewpoint of dielectric properties.

Also, Non-Patent Document 3 and Patent Document 4 disclose a thermosetting resin having benzoxazine rings in the main chain of the resin. However, Non-Patent Document 3 discloses only the compound without description of the evaluation of the properties. Additionally, Patent Document 4 discloses neither guidelines for improving the heat resistance and for imparting the flexibility nor specific compounds.

Non-Patent Document 4 discloses a decomposition mechanism of a cured article of a benzoxazine compound. The aniline and the monofunctional cresol disclosed in Non-Patent Document 4 have volatility at low temperatures.

Furthermore, Patent Document 5 discloses a method for producing a dihydrobenzoxazine compound for which both of a primary diamine compound and a primary monoamine compound are essential as amines.

Patent Document 1: Japanese Patent Laid-Open No. 49-47378
Patent Document 2: Japanese Patent Laid-Open No. 2005-239827
Patent Document 3: Japanese Patent Laid-Open No. 2003-64180
Patent Document 4: Japanese Patent Laid-Open No. 2002-338648
Patent Document 5: Japanese Patent No. 3550814
Non-Patent Document 1: Homepage of Konishi Chemical Ind. Co., Ltd. (retrieved on Nov. 24, 2005), on internet <URL: http://www.konishi-chem.co.jp/cgi-data/jp/pdf/pdf#2.pdf>
Non-Patent Document 2: Homepage of Konishi Chemical Ind. Co., Ltd. (retrieved on Sep. 18, 2007), on internet <URL: http://www.konishi-chem.co.jp/technology/oxazin.html>
Non-Patent Document 3: "Benzoxazine Monomers and Polymers: New Phenolic Resins by Ring-Opening Polymerization," J. P. Liu and H. Ishida, "The Polymeric Materials Encyclopedia," J. C. Salamone, Ed., CRC. Press, Florida (1996) pp. 484-494

DISCLOSURE OF THE INVENTION

Problems to be Solved by the Invention

Under these circumstances, a problem to be solved by the present invention is to provide a thermosetting resin excellent in heat resistance and satisfactory in electrical properties, and is significantly improved in brittleness, and a method for producing the thermosetting resin.

Another problem to be solved by the present invention is to provide a thermosetting composition comprising the thermosetting resin; molded articles, cured articles and cured molded articles of the thermosetting resin or the thermosetting composition; and electronic devices comprising these materials.

Means for Solving the Problems

The present inventors have conducted a diligent study for the purpose of solving the problems described above, and have consequently accomplished the present invention by discovering that the problems described above can be solved by including a novel ester structure in the main chain of the thermosetting resin having a benzoxazine structure.

Specifically, the present invention is as follows.

[1]

A thermosetting resin having a benzoxazine structure represented by the following formula (I):

formula (I):

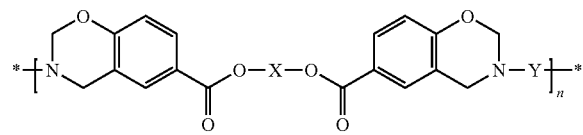

wherein in formula (I): X is a residue of a diol compound having a molecular weight or a number average molecular weight in terms of polystyrene measured by GPC of 5,000 or less; Y is a residue of a diamine compound; and n is an integer of 2 to 200.

[2]

The thermosetting resin having the benzoxazine structure according to [1], wherein Y is a residue of an aromatic diamine compound or an alicyclic diamine compound.

[3]

The thermosetting resin having the benzoxazine structure according to [1] or [2], wherein Y is a residue of an aromatic diamine compound represented by the following formula (II):

formula (II):

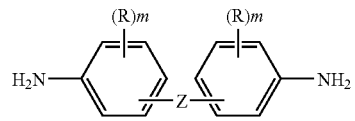

wherein in formula (II): R is an organic group having no active hydrogen and having 1 to 6 carbon atoms; the organic group may include an oxygen atom and a nitrogen atom; m represents an integer of 0 to 4; and z is a direct bond or at least one group selected from the following group A:

group A:

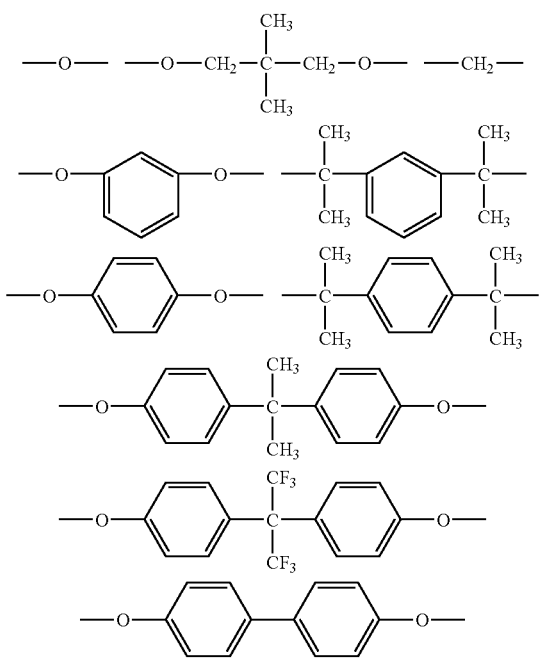

[4]

The thermosetting resin having the benzoxazine structure according to [1] or [2], wherein Y is a residue of a saturated bridged cyclic diamine compound selected from the following group B:

group B:

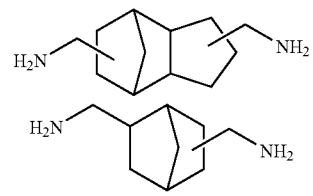

[5]

A thermosetting resin having the benzoxazine structure produced by reacting by heating a) a compound represented by the following formula (III), b) a diamine compound, and c) an aldehyde compound:

formula (III):

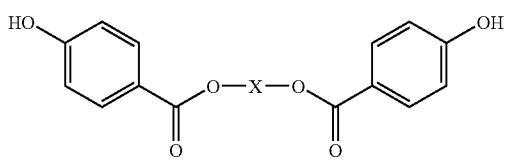

wherein in formula (III), X is a residue of a diol compound having a molecular weight or a number average molecular weight in terms of polystyrene measured by GPC of 5,000 or less.

[6]
A method for producing a thermosetting resin having the benzoxazine structure comprising:
reacting by heating a) a compound represented by the following formula (III), b) a diamine compound, and c) an aldehyde compound:

formula (III):

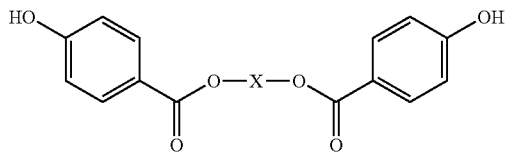

wherein in formula (III), X is a residue of a diol compound having a molecular weight or a number average molecular weight in terms of polystyrene measured by GPC of 5,000 or less.

[7]
A thermosetting composition comprising at least the thermosetting resin having the benzoxazine structure according to any one of [1] to [5] or the thermosetting resin having the benzoxazine structure, produced by the production method according to [6].

[8]
The thermosetting composition according to [7], further comprising a compound having in the molecule thereof at least one benzoxazine structure.

[9]
A molded article obtained from the thermosetting resin having the benzoxazine structure according to any one of [1] to [5], the thermosetting resin having the benzoxazine structure, produced by the production method according to [6], or the thermosetting composition according to [7] or [8].

[10]
A cured article obtained from the thermosetting resin having the benzoxazine structure according to any one of [1] to [5], the thermosetting resin having the benzoxazine structure, produced by the production method according to [6], or the thermosetting composition according to [7] or [8].

[11]
A cured molded article obtained by curing the molded article according to [9].

[12]
An electronic device comprising the molded article according to [9], the cured article according to [10] or the cured molded article according to [11].

Advantages Of The Invention

According to the present invention, there can be provided a thermosetting resin having a benzoxazine structure, that is excellent in heat resistance and satisfactory in electrical properties, and that is significantly improved in brittleness; a method for producing the thermosetting resin; a thermosetting composition comprising the thermosetting resin; molded articles, cured articles and cured molded articles of the thermosetting resin and the thermosetting composition; and electronic devices comprising these materials.

Furthermore, according to the present invention, by having a novel ester structure in the main chain of the thermosetting resin having a benzoxazine structure, there can be obtained a thermosetting resin having various properties such as low-temperature thermosetting property and excellent flexibility as compared to conventional thermosetting resins.

BEST MODE FOR CARRYING OUT THE INVENTION

Hereinafter, the present invention is described in detail on the basis of the preferred embodiments thereof.

[Thermosetting Resin Having a Benzoxazine Structure]

The thermosetting resin having a benzoxazine structure of the present invention is a thermosetting resin having a benzoxazine structure represented by the following formula (I):

formula (I):

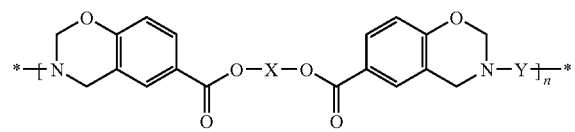

wherein in formula (I): X is a residue of a diol compound having a molecular weight or a number average molecular weight in terms of polystyrene measured by GPC of 5,000 or less; Y is a residue of a diamine compound; and n is an integer of 2 to 200.

The residue of the diol compound having a molecular weight or a number average molecular weight in terms of polystyrene measured by GPC of 5,000 or less in the thermosetting resin having a benzoxazine structure of the present invention refers to a group represented by the substructure defined by eliminating the two hydroxyl groups from the diol compound having a molecular weight or a number average molecular weight in terms of polystyrene measured by GPC of 5,000 or less.

The residue of the diamine compound in the thermosetting resin having a benzoxazine structure of the present invention refers to a group represented by the substructure defined by eliminating the two amino groups from the diamine compound.

The thermosetting resin having a benzoxazine structure of the present invention is a thermosetting resin having a benzoxazine structure represented by the following formula (I):

formula (I):

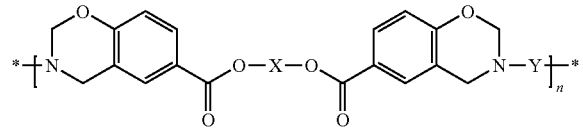

wherein in formula (I): X is a residue of a diol compound having a molecular weight or a number average molecular weight in terms of polystyrene measured by GPC of 5,000 or less; and n is an integer of 2 to 200, wherein Y is preferably a residue of an aromatic diamine compound or an alicyclic diamine compound.

The thermosetting resin having a benzoxazine structure of the present invention is a thermosetting resin having a benzoxazine structure represented by the following formula (I):

formula (I):

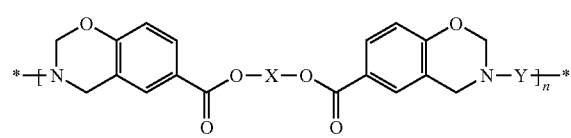

wherein in formula (I): X is a residue of a diol compound having a molecular weight or a number average molecular weight in terms of polystyrene measured by GPC of 5,000 or less; and n is an integer of 2 to 200, wherein Y is preferably a residue of an aromatic diamine compound represented by the following formula (II):

formula (II):

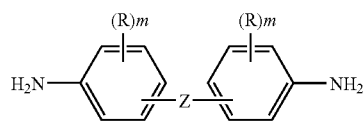

wherein in formula (II): R is an organic group having no active hydrogen and having 1 to 6 carbon atoms; the organic group may include an oxygen atom and a nitrogen atom; m represents an integer of 0 to 4; and z is a direct bond or at least one group selected from the following group A:

group A:

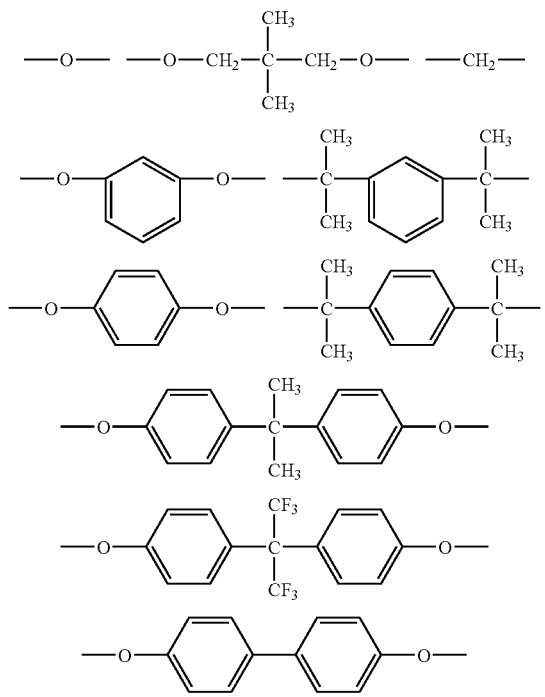

The thermosetting resin having a benzoxazine structure of the present invention is a thermosetting resin having a benzoxazine structure represented by the following formula (I):

formula (I):

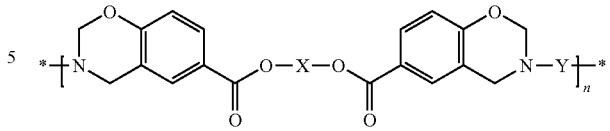

wherein in formula (I): X is a residue of a diol compound having a molecular weight or a number average molecular weigh in terms of polystyrene measured by GPC of 5,000 or less; and n is an integer of 2 to 200, wherein Y is preferably a residue of a saturated bridged cyclic diamine compound selected from the following group B:

group B:

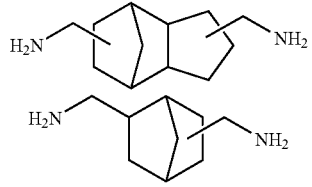

In the thermosetting resin having a benzoxazine structure of the present invention, the residue of an aromatic diamine compound or an alicyclic diamine compound, the residue of the aromatic diamine compound represented by formula (II) and the residue of the saturated bridged cyclic diamine compound selected from the group B refer to respectively the groups represented by the substructures defined by eliminating the two amino groups from the aromatic diamine compound, the aromatic or the alicyclic diamine compound, the aromatic diamine compound represented by formula (II) and the saturated bridged cyclic diamine compound selected from the group B.

In the present invention, the diol compound is not particularly limited as long as the diol compound is a compound having a molecular weight or a number average molecular weight in terms of polystyrene measured by GPC of 5,000 or less and having two alcoholic hydroxyl groups; but, examples of the diol compound include aliphatic diol compounds and aromatic diol compounds.

That the number average molecular weight in terms of polystyrene measured by GPC is 5,000 or less refers to that the number average molecular weight in terms of polystyrene obtained by gel permeation chromatography (GPC) using monodispersion polystyrene as standard is 5,000 or less.

In the present invention, examples of the aliphatic diol compound include the following aliphatic diol compounds: alkane diol compounds, alkene diol compounds and alkyne diol compounds, that may be either saturated or unsaturated and that may also be either of straight chain or of branched chain; and alicyclic aliphatic diol compounds such as cycloalkane diol compounds. The aliphatic moieties of these diol compounds may include as inserted thereinto one or more atoms, other than carbon atoms, such as oxygen atoms and nitrogen atoms, and may have one or more of the various bonds, formed with a carbon atom and atoms other than carbon atoms such as an oxygen atom or a nitrogen atom, such as an ester bond, an ether bond, an amide bond, a carbonate bond and a carbamate bond. In the alicyclic aliphatic diol compounds, the hydroxyl groups may be bonded either directly or through an aliphatic moiety to the aliphatic rings.

Additionally, examples of the aliphatic diol compounds include compounds having two alcoholic hydroxyl groups, among the polymer compounds obtained by polymerization of one or more types of monomer compounds.

Examples of the aliphatic diol compound include: ethylene glycol, 1,2-propylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 3-methyl-1,5-pentanediol, 1,4-cyclohexanedimethanol, hydrogenated bisphenol A, hydroxy-terminated polybutadiene (for example, "Poly bd" manufactured by Idemitsu Kosan Co., Ltd.), hydroxy-terminated polyisoprene (for example, "Poly ip" manufactured by Idemitsu Kosan Co., Ltd.), or hydrogenated products (for example, "Epol" manufactured by Idemitsu Kosan Co., Ltd., and "NISSO PB" manufactured by Nippon Soda Co., Ltd.) of hydroxy-terminated polybutadiene and hydroxy-terminated polyisoprene, polyolefin polyol (for example, "Polyther" manufactured by Mitsubishi Chemical Corp.), polyester polyol, and polycarbonate diol (for example, "PCD" manufactured by Ube Industries, Ltd., "PCDL" manufactured by Asahi Kasei Corp., "Plakcel CD" manufactured by Daicel Chemical Industries, Ltd., "Kuraray Polyol C" manufactured by Kuraray Co., Ltd.). Preferably, examples of the aliphatic diol compound include: C2-20 aliphatic hydrocarbon diol compounds (HO—$C_nH_{2n}$—OH (n represents an integer of 2 to 20)) such as ethylene glycol, 1,2-propylene glycol, 1,3-propanediol, 1,4-butanediol, 1,5-pentanediol, 1,6-hexanediol, 1,7-heptanediol, 1,8-octanediol, 1,9-nonanediol, 1,10-decanediol and 1,12-dodecanediol; hydroxy-terminated polybutadiene and hydroxy-terminated polyisoprene, and the hydrogenated products of these; and polyolefin polyols. From the viewpoint of the flexibility of the thermosetting resin, more preferably, examples of the aliphatic diol compound include 1,5-pentanediol, 1,6-hexanediol, 1,7-heptanediol, 1,8-octanediol, 1,9-nonanediol, 1,10-decanediol and 1,12-dodecanediol; hydroxy-terminated polybutadiene and hydroxy-terminated polyisoprene, and the hydrogenated products of these; and polyolefin polyols.

In the present invention, the aromatic diol compound is not particularly limited as long as the aromatic diol compound is an aromatic compound having two alcoholic hydroxyl groups. Examples of the aromatic compound having two alcoholic hydroxyl groups include: compounds having an aryl structure such as a benzene ring or a naphthalene ring having one or more substituents in the molecule thereof or being nonsubstituted, and compounds having a heteroaryl structure having one or more substituents or being nonsubstituted, these compounds being substituted with two groups having an aliphatic structure with an alcoholic hydroxyl group bonded thereto. Alternatively, the aromatic compound having two alcoholic hydroxyl groups may be a compound in which two or more aryl rings or heteroaryl rings having an aliphatic structure with an alcoholic hydroxyl group bonded thereto are bonded to each other directly or through an aliphatic structure.

Specific examples of the aromatic diol compounds include bis(2-hydroxyethyl) terephthalate, 1,3-bis(2-hydroxyethoxy)benzene, 1,4-bis(2-hydroxyethoxy)benzene and 2,2-bis[4-(2-hydroxyethoxy)phenyl]propane.

In the present invention, the diol compounds may be used alone or as mixtures of two or more thereof. The diol compound is a compound having two alcoholic hydroxyl groups; however, compounds having three or more alcoholic hydroxyl groups may be included within a range which does not deviate from the objects of the present invention.

In the present invention, the diamine compound is not particularly limited as long as the diamine compound is a compound having two amino groups; examples of the diamine compound include aromatic diamine compounds and aliphatic diamine compounds. Preferably, examples of the diamine compound include aromatic diamine compounds and alicyclic diamine compounds.

In the present invention, the aromatic diamine compound is not particularly limited as long as the aromatic diamine compound is an aromatic compound having two amino groups.

Examples of the aromatic compound include compounds having an aryl structure such as a benzene ring or a naphthalene ring having one or more substituents in the molecule thereof or being nonsubstituted, and compounds having a five-membered ring or six-membered ring heteroaryl structure having one to three nitrogen atoms, oxygen atoms or sulfur atoms and having one or more substituents or being nonsubstituted. The aromatic compound may be a compound in which two or more aryl rings or heteroaryl rings are bonded to each other directly or through an ether bond or an aliphatic structure.

Specific examples of the compound, having an aryl structure such as a benzene ring or a naphthalene ring having one or more substituents in the molecule thereof or being nonsubstituted, include o-diaminobenzene, m-diaminobenzene, p-diaminobenzene, 1,2-diaminonaphthalene, 1,3-diaminonaphthalene, 1,4-diaminonaphthalene, 1,5-diaminonaphthalene, 1,6-diaminonaphthalene, 1,7-diaminonaphthalene, 1,8-diaminonaphthalene, 2,3-diaminonaphthalene, 2,6-diaminonaphthalene and 2,7-diaminonaphthalene.

In the present invention, the compound in which two or more aryl rings or heteroaryl rings are bonded to each other directly or through an ether bond or an aliphatic structure is preferably a compound represented by the following formula (II):

formula (II):

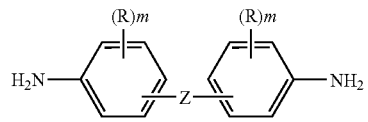

wherein in formula (II): R is an organic group having no active hydrogen and having 1 to 6 carbon atoms; the organic group may include an oxygen atom and a nitrogen atom; m represents an integer of 0 to 4 and means the number of the R substituents in the benzene ring; and z is a direct bond or at least one group selected from the following group A:

group A:

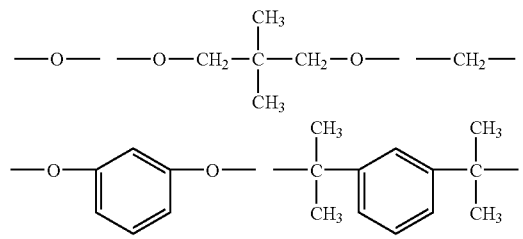

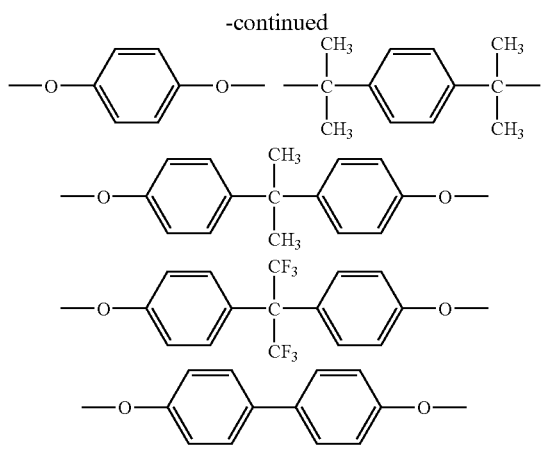

Examples of the organic group having no active hydrogen and having 1 to 6 carbon atoms as R in the aromatic diamine compound represented by the formula (II) include the groups selected from the following: alkyls, alkenyls and alkynyls each of which has 1 to 6 carbon atoms, is either saturated or unsaturated and is either of straight chain or of branched chain; cycloalkyls having 3 to 6 carbon atoms; and substituted or nonsubstituted aryls such as phenyl; specific examples of R include the groups selected from the groups such as methyl, ethyl, propyl, isopropyl, butyl, t-butyl, pentyl and hexyl.

Examples of the organic group R as an organic group that may include an oxygen atom or a nitrogen atom include the groups selected from the groups, each of which has 1 to 6 carbon atoms, is saturated or unsaturated and is of straight chain or of branched chain, such as alkyloxy, dialkylamino, alkenyloxy, dialkenylamino, alkynyloxy, dialkynylamino, alkyloxyalkyl and dialkylaminoalkyl; specific examples of the organic group R include the groups selected from the groups such as methyloxy, ethyloxy, dimethylamino and diethylamino.

In the aromatic diamine compound represented by the formula (II), preferably, R are the groups selected from methyl, ethyl, methyloxy, ethyloxy, dimethylamino and diethylamino; from the viewpoint of reactivity, more preferably, R is a methyl group.

Moreover, in the aromatic diamine compound represented by the formula (II), the case where m is 0 is also preferable. That m is 0 refers to that in the aromatic diamine compound represented by the formula (II), the aromatic rings are non-substituted benzene rings in which R is H.

The aromatic diamine compounds represented by the formula (II) can be produced according to heretofore known methods with reference to the documents such as "The Current Polyimides—Fundamentals and Applications" (Edited by Japan Society of the Study of Polyimide, published on Jan. 28, 2002 by NTS Inc.) pp. 516 to 524.

Specific examples of the aromatic diamine compound represented by the formula (II) include benzidine, o-tolidine, 4,4'-diaminodiphenylmethane, 4,4'-diamino-3,3'-dimethyldiphenylmethane ("Kayabond C-100" manufactured by Nippon Kayaku Co., Ltd.), 4,4'-diamino-3,3'-diethyldiphenylmethane ("Kayahard A-A" manufactured by Nippon Kayaku Co., Ltd.), 4,4'-diamino-3,3',5,5'-tetramethyldiphenylmethane ("Kayabond C-200S" manufactured by Nippon Kayaku Co., Ltd.), 4,4'-diamino-3,3',5,5'-tetraethyldiphenylmethane ("Kayabond C-300S" manufactured by Nippon Kayaku Co., Ltd.), 4,4'-diamino-3,3'-diethyl-5,5'-dimethyldiphenylmethane, 4,4'-diaminodiphenyl ether, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(4-aminophenoxy)neopentane, 4,4'-[1,3-phenylenebis(1-methyl-ethylidene)]bisaniline ("Bisaniline M" manufactured by Mitsui Chemicals, Inc.), 4,4'-[1,4-phenylenebis(1-methyl-ethylidene)]bisaniline ("Bisaniline P" manufactured by Mitsui Chemicals, Inc.), 2,2-bis[4-(4-aminophenoxy)phenyl]propane ("BAPP" manufactured by Wakayama Seika Kogyo Co., Ltd.), 2,2-bis[4-(4-aminophenoxy)phenyl]hexafluoropropane and 4,4'-bis(4-aminophenoxy) biphenyl.

From the viewpoints of the properties of the obtained thermosetting resins and the easy availability of the diamine compounds, examples of the preferable compounds as the aromatic diamine compound represented by the formula (II), among the above-listed aromatic diamine compounds, include 4,4'-diaminodiphenylmethane, 4,4'-diamino-3,3'-dimethyldiphenylmethane, 4,4'-diamino-3,3'-diethyldiphenylmethane, 4,4'-diamino-3,3',5,5'-tetramethyldiphenylmethane, 4,4'-diamino-3,3',5,5'-tetraethyldiphenylmethane, 4,4'-diamino-3,3'-diethyl-5,5'-dimethyldiphenylmethane, 4,4'-diaminodiphenyl ether, 4,4'-[1,3-phenylenebis(1-methyl-ethylidene)]bisaniline, 4,4'-[1,4-phenylenebis(1-methyl-ethylidene)]bisaniline, 2,2-bis[4-(4-aminophenoxy)phenyl]hexafluoropropane and 2,2-bis[4-(4-aminophenoxy)phenyl]propane.

Examples of the more preferable compounds include 4,4'-diaminodiphenylmethane, 4,4'-diamino-3,3'-dimethyldiphenylmethane, 4,4'-[1,3-phenylenebis(1-methyl-ethylidene)]bisaniline, 2,2-bis[4-(4-aminophenoxy)phenyl]hexafluoropropane and 2,2-bis[4-(4-aminophenoxy)phenyl]propane.

In the aromatic diamine compound represented by the formula (II), the bonding position of z can be the ortho position, the meta position or the para position relative to the amino group in the benzene ring; the compounds in which z is bonded at the meta position or the para position are preferable.

In the present invention, examples of the aliphatic diamine compound include: aliphatic diamine compounds such as alkane diamine compounds, alkene diamine compounds and alkyne diamine compounds, that may be either saturated or unsaturated and that may also be either of straight chain or of branched chain; and alicyclic diamine compounds such as cycloalkane diamine compounds, bis(aminoalkyl)cycloalkane compounds, and saturated bridged cyclic diamine compounds, that may be either saturated or unsaturated. Preferably, examples of the aliphatic diamine compound include alicyclic diamine compounds and, more preferably, examples of the aliphatic diamine compound include saturated bridged cyclic diamine compounds.

The aliphatic moieties of the aliphatic diamine compounds may include as inserted thereinto one or more atoms, other than carbon atoms, such as oxygen atoms and nitrogen atoms, and may have one or more of the various bonds, formed with a carbon atom and atoms other than carbon atoms such as an oxygen atom or a nitrogen atom, such as an ester bond, an ether bond, an amide bond, a carbonate bond and a carbamate bond.

In the present invention, the saturated bridged cyclic diamine compound is not particularly limited as long as the saturated bridged cyclic diamine compound is an alicyclic diamine compound having a condensed-ring structure such as a compound having a bicyclo or tricyclo ring structure having two amino groups.

Examples of the bicyclo and tricyclo ring structure include alicyclic hydrocarbon structures, having condensed ring structure, such as a norbornene skeleton (bicyclo[2,2,1]heptane), a dicyclopentadiene skeleton (tricyclo[5,2,1,0$^{2,6}$]decane) and an adamantane skeleton (tricyclo[3,3,1,1$^{3,7}$]decane).

In the saturated bridged cyclic diamine compounds, the amino groups may be bonded, directly or through an aliphatic moiety such as an alkylene such as methylene or ethylene, to the bicyclo ring moiety or the tricyclo ring moiety. Moreover, the hydrogen atoms of the alicyclic hydrocarbon groups of these condensed ring structures may be substituted with the groups such as alkyl groups.

In the present invention, the saturated bridged cyclic diamine compound is preferably an alicyclic diamine compound selected from the following group B:

group B:

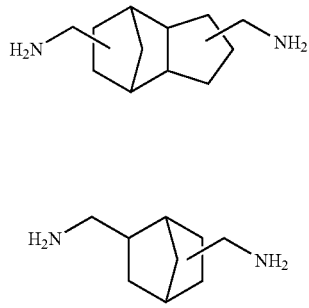

Specific examples of the saturated bridged cyclic diamine compound include 3(4),8(9),-bis(aminomethyl)tricyclo[5,2,1,0$^{2,6}$]decane ("TCD Diamine" manufactured by Celanese Corp.) and 2,5(6)-bis(aminomethyl)bicyclo[2,2,1]heptane ("NBDA" manufactured by Mitsui Chemicals, Inc.).

In the present invention, the diamine compounds may be used either alone or as mixtures of two or more thereof. Moreover, even when these diamine compounds include as by-products triamine or higher polyamine compounds, as long as the contents of such polyamine compounds fall within a range which does not deviate from the objects of the present invention, practically no problem is caused.

The thermosetting resin of the present invention has properties such that it is particularly excellent in heat resistance and satisfactory in electrical properties, and is significantly improved in brittleness; additionally, the thermosetting resin of the present invention is a resin having various advantages such that it is excellent in properties such as water resistance, chemical resistance, mechanical strength and reliability, free from problems with respect to the volatile by-products at the time of curing and the cost, excellent in storage property, and wide in degree of freedom in molecular design; the resin can be easily processed into forms such as film and sheet.

The thermosetting resin having a benzoxazine structure of the present invention is a thermosetting resin obtained by the method for producing a thermosetting resin having a benzoxazine structure, described below in detail.

The thermosetting resin having a benzoxazine structure of the present invention is a thermosetting resin obtained by a method for producing a thermosetting resin having a benzoxazine structure by reacting by heating a) a compound represented by the following formula (III), b) a diamine compound, and c) an aldehyde compound:

formula (III):

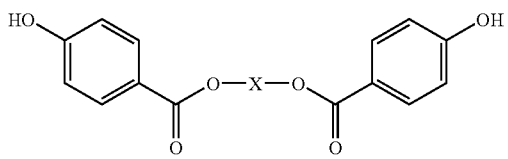

wherein in formula (III), X is a residue of a diol compound having a molecular weight or a number average molecular weight in terms of polystyrene measured by GPC of 5,000 or less.

The thermosetting resin having a benzoxazine structure of the present invention is preferably a thermosetting resin having a benzoxazine structure, obtained by a production method in which b) the diamine compound is an aromatic diamine compound or an alicyclic diamine compound.

The thermosetting resin having a benzoxazine structure of the present invention is preferably a thermosetting resin having a benzoxazine structure, obtained by a production method in which the aromatic diamine compound is a compound represented by the following formula (II):

formula (II):

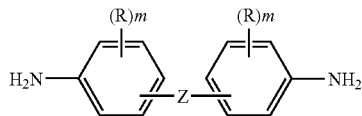

wherein in the formula (II): R is an organic group having no active hydrogen and having 1 to 6 carbon atoms; the organic group may include an oxygen atom and a nitrogen atom; m represents an integer of 0 to 4; and z is a direct bond or at least one group selected from the following group A:

group A:

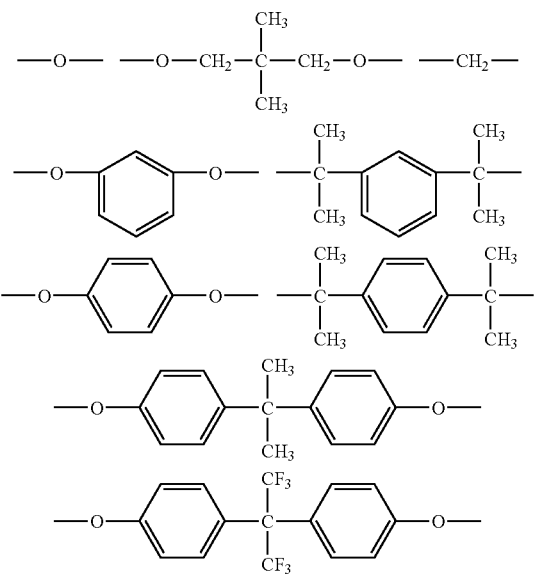

-continued

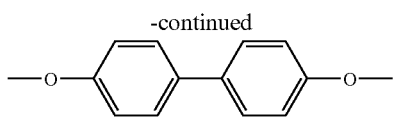

The thermosetting resin having a benzoxazine structure of the present invention is preferably a thermosetting resin having a benzoxazine structure, obtained by a production method in which the diamine compound is a saturated bridged cyclic diamine compound selected from the following group B:

group B:

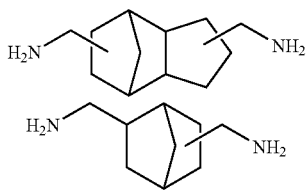

The thermosetting resin having a benzoxazine structure of the present invention is preferably a thermosetting resin having a benzoxazine structure, obtained by a production method in which c) the aldehyde compound is formaldehyde, acetaldehyde, propionaldehyde or butyraldehyde.

In the present invention, the case where c) the aldehyde compound is formaldehyde is preferable, and in particular, preferable is a thermosetting resin having a dibenzoxazine structure, obtained by a production method in which paraformaldehyde is used as c) the aldehyde compound.

The thermosetting resin having a benzoxazine structure of the present invention has, preferably, a structure represented by the following formula (I'):

formula (I'):

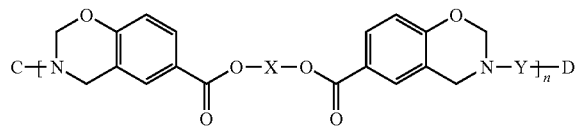

wherein in formula (I): X is a residue of a diol compound having a molecular weight or a number average molecular weight in terms of polystyrene measured by GPC of 5,000 or less; Y is a residue of a diamine compound; and n is an integer of 2 to 200, wherein C is a group selected from the following group C:

group C:

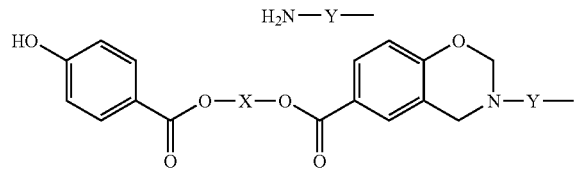

and D is a group selected from the following group D:

group D:

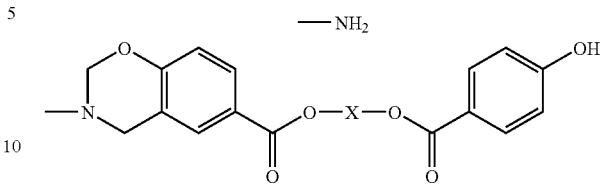

In the below-described production method in the present invention, when the production is performed by using another phenolic compound such as a monofunctional phenolic compound or a bifunctional phenolic compound, a monofunctional amine compound or a trifunctional or higher multifunctional amine compound, and another diamine compound and the like, the C and D in the formula (I') may also be the residues of these compounds.

[Method for Producing the Thermosetting Resin Having a Benzoxazine Structure]

The method for producing the thermosetting resin having a benzoxazine structure of the present invention is characterized in that a) a compound represented by the following formula (III), b) a diamine compound and c) an aldehyde compound are reacted by heating. And, the production method of the present invention enables to obtain the thermosetting resin having a benzoxazine structure. The obtained thermosetting resin having a benzoxazine structure is excellent in heat resistance and satisfactory in electrical properties, and is significantly improved in brittleness:

formula (III):

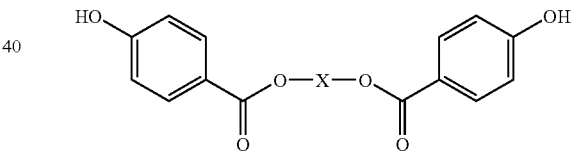

wherein in formula (III), X is a residue of a diol compound having a molecular weight or a number average molecular weight in terms of polystyrene measured by GPC of 5,000 or less.

In the method for producing the thermosetting resin having a benzoxazine structure of the present invention, the compound of the a) component represented by the formula (III) can be produced according to the following scheme, by the esterification reaction with p-hydroxybenzoic acid and a diol compound:

[Formula 27]

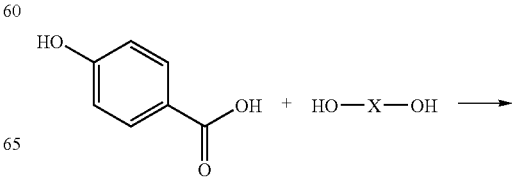

-continued

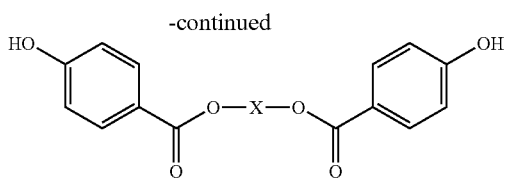

wherein in the above-presented scheme, X is a residue of the diol compound having a molecular weight or a number average molecular weight in terms of polystyrene measured by GPC of 5,000 or less.

When the compound of the a) component represented by the formula (III) is produced, the diol compounds may be used either alone or as mixtures of two or more thereof. The diol compound is a compound having two alcoholic hydroxyl groups; however, compounds having three or more alcoholic hydroxyl groups may be included in the diol compound within a range which does not deviate from the objects of the present invention.

The esterification reaction can be performed by heating p-hydroxybenzoic acid and the diol compound in the presence of, for example, an acid catalyst. By performing the esterification reaction, the compound represented by the formula (III) can be obtained.

When the esterification reaction is performed, the reaction may be performed by diluting the reaction solution with a inert solvent using the inert solvent. In particular, when p-hydroxybenzoic acid does not dissolve or partially dissolves in the diol compound, it is preferable to use an inert solvent for the purpose of making the reaction smoothly proceed. Examples of the inert solvent include: aromatic hydrocarbon solvents such as toluene, xylene and trimethylbenzene; halogen solvents such as chloroform and methylene chloride; ether solvents such as tetrahydrofuran, dioxane, diethylene glycol dimethyl ether, diethylene glycol diethyl ether and dipropylene glycol dimethyl ether; and ketone solvents such as acetone, methyl ethyl ketone, methyl isobutyl ketone and cyclohexanone.

It is also preferable to remove the water produced in the esterification reaction from the reaction system to make the reaction progress. For the purpose of removing the water, a solvent such as toluene or xylene azeotropic with water may be used, or alternatively the reaction may be performed under a reduced pressure to remove the water.

Examples of the catalyst for the esterification reaction include: inorganic acids such as hydrochloric acid and sulfuric acid; organic sulfonic acids such as benzenesulfonic acid, p-toluenesulfonic acid and methanesulfonic acid; solid acids such as activated clay, acid clay and an acidic ion exchange resin; and titanium alkoxide. The amount of the catalyst depends on the type of the catalyst; however, the amount of the catalyst is generally approximately 0.01 to 30% by mass based on the total amount of p-hydroxybenzoic acid and the alcohol corresponding to p-hydroxybenzoic acid. The catalyst amount less than the lower limit of the above-specified range makes the progress of the reaction too slow; on the other hand, the catalyst amount larger than the upper limit of the above-specified range causes economic disadvantage and also makes the catalyst removal difficult.

The compound represented by the formula (III) as the a) component can be produced by using a heretofore known esterification method, and may be produced, for example, by the interesterification reaction with a p-hydroxybenzoic acid ester and a diol compound.

In the method for producing the thermosetting resin having a benzoxazine structure of the present invention, the compounds represented by the formula (III) as the a) component may be used either alone or as mixtures of two or more thereof.

In the method for producing the thermosetting resin having a benzoxazine structure of the present invention, the diamine compound as the b) component is not particularly limited as described above as long as the compound is a compound having two amino groups.

In the method for producing the thermosetting resin having a benzoxazine structure of the present invention, the diamine compounds may be used either alone or as mixtures of two or more thereof. Moreover, even when these diamine compounds include as by-products higher polyamine compounds than triamine, as long as the contents of such polyamine compounds each fall within a range which does not deviate from the objects of the present invention, practically no problem is caused.

In the method for producing the thermosetting resin having a benzoxazine structure of the present invention, the aldehyde compound of the c) component is not particularly limited; however, specific examples of the aldehyde compound as the c) component include formaldehyde, acetaldehyde, propionaldehyde and butyraldehyde, and formaldehyde is preferable. Formaldehyde can be used in forms such as paraformaldehyde which is a polymer of formaldehyde and formalin which is a form of an aqueous solution of formaldehyde; it is preferable to use paraformaldehyde because the reaction proceeds mildly.

In the method for producing the thermosetting resin having a benzoxazine structure of the present invention, it is possible to further use, as a d) component along with the above-described a) to c) components, another phenolic compound such as a monofunctional phenolic compound or a bifunctional phenolic compound within a range which does not deviate from the objects of the present invention.

Specific examples of phenolic compounds as such d) component include: monofunctional phenolic compounds such as phenol, o-cresol, m-cresol, p-cresol, p-t-butylphenol, p-t-octylphenol, p-α-cumylphenol, p-phenylphenol, p-cyclohexylphenol, p-dodecylphenol, methyl p-hydroxybenzoate, ethyl p-hydroxybenzoate, butyl p-hydroxybenzoate and 2-ethylhexyl p-hydroxybenzoate; and bifunctional phenol compounds such as 4,4'-biphenol, 2,2'-biphenol, 4,4'-dihydroxydiphenyl ether, 2,2'-dihydroxydiphenyl ether, 4,4'-dihydroxydiphenylmethane, 2,2'-dihydroxydiphenylmethane, 2,2-bis(4-hydroxyphenyl) propane, 4,4'-dihydroxybenzophenone, 1,1-bis(4-hydroxyphenyl)ethane, 1,1-bis(4-hydroxyphenyl)propane, 1,1-bis(4-hydroxyphenyl)butane, 2,2-bis(4-hydroxyphenyl) butane, 1,1-bis(4-hydroxyphenyl)-2-methylpropane, 1,1-bis (4-hydroxyphenyl)cyclohexane, 1,1-bis(4-hydroxyphenyl) cyclopentane, 1,1-bis(4-hydroxyphenyl)-1-phenylethane, bis (4-hydroxyphenyl)diphenylmethane, 9,9-bis(4-hydroxyphenyl)fluorene, 2,2-bis(4-hydroxyphenyl) hexafluoropropane, 1,3-bis(4-hydroxyphenoxy)benzene, 1,4-bis(3-hydroxyphenoxy)benzene, 4,4'-[1,4-phenylenebis (1-methyl-ethylidene)]bisphenol ("Bisphenol P" manufactured by Mitsui Chemicals, Inc., commercially available under the compound name of "α,α'-bis(4-hydroxyphenyl)-1, 4-diisopropylbenzene" from Tokyo Chemical Industry Co., Ltd.) and 4,4'-[1,3-phenylenebis(1-methyl-ethylidene)] bisphenol ("Bisphenol M" manufactured by Mitsui Chemicals, Inc.). When these monofunctional phenolic compounds and bifunctional phenolic compounds are used, one or two or more thereof can be used.

The solvent used in the method for producing the thermosetting resin having a benzoxazine structure of the present invention is not particularly limited; however, solvents having satisfactory solubilities for raw materials facilitate the progress of the benzoxazine ring formation reaction. Examples of such solvents include: aromatic hydrocarbon solvents such as toluene, xylene and trimethylbenzene; halogen solvents such as chloroform and dichloromethane; ether solvents such as THF and dioxane. Toluene and xylene are preferable among these because toluene and xylene are small in the load on the environment and the human body, high in versatility and low in price; toluene is more preferable.

By producing the thermosetting resin having a benzoxazine structure by adding an alcohol to the above-described solvent, the solubilities of each of the components in the above-described solvent can also be adjusted. Examples of the alcohol to be added include methanol, ethanol, 1-propanol, isopropanol, 1-butanol, 2-butanol, isobutanol and t-butanol.

In the production of the thermosetting resin having a benzoxazine structure, the reaction temperature and the reaction time are not particularly limited; however, the reaction may be generally performed at a temperature from room temperature to approximately 160° C. for from a few tens minutes to a few hours. In the present invention, it is preferable to perform the reaction particularly at 30 to 140° C. for 20 minutes to 9 hours, as a result, under such conditions the reaction is allowed to proceed so as to yield a polymer capable of developing the functions as the thermosetting resin having a benzoxazine structure of the present invention.

In the method for producing the thermosetting resin having a benzoxazine structure of the present invention, removal of the water produced at the time of the reaction to outside the system is also an effective technique to allow the reaction to proceed.

The polymer can be obtained by drying the reaction solution after completion of the reaction, and the polymer can also be precipitated by concentrating the reaction solution. Moreover, the polymer can be precipitated by adding a large amount of a poor solvent such as methanol to the solution after the reaction, and by separating and drying the precipitated polymer, the targeted polymer can be obtained.

Within a range in which the properties of the thermosetting resin having a benzoxazine structure of the present invention are not impaired, the monofunctional amine compounds, the trifunctional or higher polyfunctional amine compounds and other diamine compounds can also be used. The use of a monofunctional amine enables to adjust the degree of polymerization, and the use of a trifunctional or higher polyfunctional amine yields a branched polymer. Moreover, the use of other diamine compounds in combination enables to adjust the physical properties. These compounds can be used simultaneously with the diamine compounds essential for the present invention; on the other hand, these compounds can be added to be reacted to the reaction system in later stages in consideration of the sequence of the reaction.

[Thermosetting Composition]

The thermosetting composition of the present invention comprises at least the above-described thermosetting resin having a benzoxazine structure. The thermosetting composition of the present invention preferably comprises as the main component thereof the thermosetting resin having a benzoxazine structure; examples of the thermosetting composition include a thermosetting composition comprising as the main component thereof the thermosetting resin having a benzoxazine structure and additionally as a subcomponent another thermosetting resin.

Examples of the other thermosetting resin as the subcomponent include epoxy resin, thermosetting modified polyphenylene ether resin, thermosetting polyimide resin, silicon resin, melamine resin, urea resin, allyl resin, phenolic resin, unsaturated polyester resin, bismaleimide resin, alkyd resin, furan resin, polyurethane resin and aniline resin. More preferable among these are epoxy resin, phenolic resin and thermosetting polyimide resin from the view point that these resins enable to more improve the heat resistance of the molded articles formed from the compositions comprising these resins. These other thermosetting resins may be used either alone or in combinations of two or more thereof.

In the thermosetting composition of the present invention, a compound having at least one benzoxazine ring or preferably having two benzoxazine rings in the molecule thereof may be used as the subcomponent. Such a compound can be obtained from the condensation reaction between a compound having a phenolic hydroxyl group in the molecule thereof and H at one of the ortho positions relative to the hydroxyl group, a compound having a primary amino group in the molecule thereof and formaldehyde. In this case, when a compound having two or more phenolic hydroxyl groups in the molecule thereof is used, a compound having only one primary amino group in the molecule thereof is used; on the other hand, when a compound having two or more primary amino groups in the molecule thereof is used, a compound having only one phenolic hydroxyl group in the molecule thereof is used. The compounds each having at least one benzoxazine ring in the molecule thereof may be used either alone or in combinations of two or more thereof.

Specific examples of the compound having at least one benzoxazine ring in the molecule thereof include, but are not limited to, the compounds represented by the following formulas (1) to (3):

formula (1):

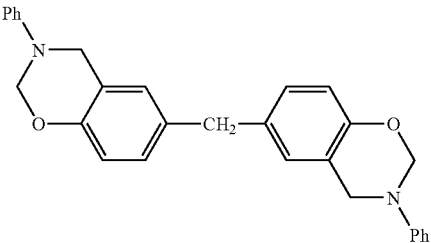

formula (2):

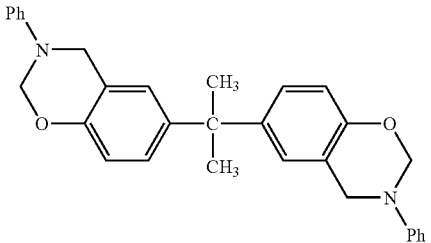

formula (3):

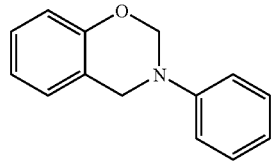

The thermosetting composition of the present invention may comprise, if necessary, various additives such as a flame retardant, a nucleating agent, an antioxidant (anti-aging agent), a heat stabilizer, a light stabilizer, an ultraviolet absorber, a lubricant, a flame retardant aid, an antistatic agent, an antifogging agent, a filler, a softener, a plasticizer and a coloring agent. These additives may be used either alone or in combinations of two or more thereof. Furthermore, when the thermosetting composition of the present invention is prepared, either a reactive solvent or a nonreactive solvent can be used.

[Molded Article, Cured Article and Cured Molded Article]

The molded article of the present invention is a molded article obtained, if necessary, by partially curing or without curing the above-described thermosetting resin having a benzoxazine structure or the above-described thermosetting composition comprising the thermosetting resin having a benzoxazine structure. The molded article of the present invention may be either a molded article (cured molded article) obtained by once molding before curing and by thereafter curing by applying heat or a molded article (cured article) obtained by curing simultaneously with molding because the above-described thermosetting resin having a benzoxazine structure has moldability even before curing. The dimension and the shape of the molded article is not particularly limited; examples of the shape of the molded article include a sheet shape (a plate shape) and a block shape; further the molded article may be provided with another portion (such as an adhesive layer).

As the curing method in the present invention, any of heretofore known curing methods can be used; in general, the heating may be satisfactorily performed at approximately 120 to 260° C. for a few hours; the heating temperature lower than specified herein or the heating time shorter than specified herein results in an insufficient curing to cause insufficient mechanical strength as the case may be. On the other hand, the heating temperature too higher than specified herein or the heating time too long as compared to the heating time specified herein causes side reactions such as decomposition to unfavorably degrade the mechanical strength as the case may be. Accordingly, it is preferable to select the conditions appropriate to the properties of the thermosetting resin having a benzoxazine structure of the present invention and the thermosetting composition comprising the thermosetting resin.

As for the curing temperature in the case where curing is assumed to be conducted with pressurized heated steam and in the case where heat curing with another method such as a method using heating wire is assumed to be adopted, the curing temperature is preferably a temperature capable of curing and low, from the viewpoint of energy saving; thus, curing is conducted preferably at 190° C. or lower, and more preferably at 185° C. or lower. From the viewpoint of the completion of curing, it is appropriate that the lower limit of the curing time is 10 minutes or more, preferably 15 minutes or more and more preferably 30 minutes. From the viewpoint of the productivity, the upper limit of the curing time is 10 hours or less, preferably 5 hours or less and more preferably 3 hours or less.

The conditions that the curing reaction inclusive of crosslinking and other reactions proceeds to a sufficient extent and the extent of reaction is 60% or more and preferably 80% or more at the curing temperature and in the curing time adopted in the actual production process of the cured molded article come to be advantageous from the viewpoints of the secular change, the temporal change, the process adaptability and the thermal shock resistance.

The extent of reaction can be obtained as follows: for the thermosetting resin having a benzoxazine structure of the present invention, a DSC measurement is performed on each of the uncured state and the cured state obtained by curing under the above-described actual production process conditions; and the extent of reaction can be obtained from a ratio between the areas of the exothermic peaks identified as a result of the curing reaction. The exothermic peak as referred to herein is the peak at around 240° C. and the area of the exothermic peak is obtained with a base line set in a region from approximately 213° C. to approximately 281° C.

Specifically, the exothermic peak area, obtained when the thermosetting resin having a benzoxazine structure in an uncured state is almost perfectly cured with a DSC measurement apparatus, is represented by p. The thermosetting resin having a benzoxazine structure cured under the actual production process conditions is subjected to an exothermic peak area measurement with the DSC measurement apparatus and the exothermic peak area thus obtained is represented by q. The extent of reaction is defined as $(p-q)/p \times 100(\%)$. In this case, the DSC measurement is generally performed approximately at a temperature increase rate of 10° C./min in a range from 23° C. to 300° C., and in consideration of the atmosphere of the actual production process, the DSC measurement can be performed under an atmosphere of an inert gas such as nitrogen or argon or in air.

In the present invention, when curing is conducted, an appropriate curing accelerator may be added. As the curing accelerator, any of the curing accelerators commonly used in the ring-opening polymerization of the benzoxazine compound can be used. Examples of the curing accelerator include: multifunctional phenols such as catechol and bisphenol A; sulfonic acids such as p-toluenesulfonic acid and p-phenolsulfonic acid; carboxylic acids such as benzoic acid, salicylic acid, oxalic acid and adipic acid; metal complexes such as cobalt(II) acetylacetonate, aluminum(III) acetylacetonate and zirconium(IV) acetylacetonate; metal oxides such as calcium oxide, cobalt oxide, magnesium oxide and iron oxide; calcium hydroxide; imidazole and the derivatives thereof; tertiary amines such as diazabicycloundecene and diazabicyclononene, and the salts of these; and phosphorus compounds and the derivatives thereof such as triphenylphosphine, triphenylphosphine-benzoquinone derivative, triphenylphosphine-triphenylboron salt and tetraphenylphosphonium-tetraphenylborate. The curing accelerators may be used either alone or as mixtures of two or more thereof.

The addition amount of the curing accelerator is not particularly limited; however, when the addition amount is too large, the dielectric constant and the dielectric loss tangent of the molded article are increased to degrade the dielectric properties, or the mechanical properties of the molded article is adversely affected, as the case may be; therefore, in general, the curing accelerator is used in a proportion of 20 parts by mass or less, preferably 15 parts by mass or less and more preferably 10 parts by mass or less based on 100 parts by mass of the thermosetting resin.

The molded article of the present invention has in the structure thereof a benzoxazine structure, and hence can realize excellent dielectric properties.

On the basis of the thermosetting property of the thermosetting resin having a benzoxazine structure or of the thermosetting composition, the molded article of the present invention is excellent in reliability, flame retardancy, moldability, aesthetic appearance and the like, and moreover, the glass transition temperature (Tg) of the molded article is high; therefore, the molded article of the present invention can be applied to a portion undergoing stress or to a movable portion, and moreover, no volatile by-products are evolved at the time of polymerization and hence such volatile by-products do not remain in the molded article favorably from the view point of hygienic management.

[Electronic Device]

The electronic device of the present invention comprises any one of the thermosetting resin having a benzoxazine structure, the thermosetting composition, the molded article, the cured article and the cured molded article. The molded article and the like can be used as electronic parts, electronic devices and as the materials for the electronic parts and devices, in particular, in applications to multilayer substrates, laminated plates, encapsulants and adhesives required to have excellent dielectric properties.

In the present invention, specific examples of the electronic devices include cellular phones, display devices, in-vehicle devices, computers and communication devices.

The molded article and the like of the present invention can also be used in applications to aircraft components, automobile components, building components and the like. Additionally, by being used as conductive materials, in particular, as heat resistant binders for metal fillers, the molded article and the like of the present invention may be used in applications to the formation of the circuits capable of passing direct current or alternating current.

EXAMPLES

Hereinafter, typical Examples in the present invention are presented, but the present invention is not limited by these Examples. It is to be noted that the measurement methods and the evaluation methods used in the present invention are as follows.

[$^1$H-NMR Measurement]

Measurements were performed with an NMR measurement apparatus, "ECX-400," manufactured by JEOL Ltd.

[GPC Measurement]

Measurements were performed with a high performance liquid chromatograph system manufactured by Shimadzu Corp., by using THF as a developing solvent, at a column temperature of 40° C. and at a flow rate of 1.0 ml/min. As a detector, "RID-10A" was used. Two "KF-804L" columns (exclusion limit molecular weight: 400,000) manufactured by Shodex were connected in series to be used as the column. As polystyrene standards, "TSK Standard Polystyrene" manufactured by Tosoh Corp. was used; the standards having weight average molecular weights (Mw) of 354,000, 189,000, 98,900, 37,200, 17,100, 9,830, 5,870, 2,500, 1,050 and 500 were used to prepare a calibration curve, with which the molecular weight calculation was performed.

[DSC Measurement]

Measurements were performed with "DSC-60" manufactured by Shimadzu Corp., under an atmosphere of argon, at a temperature rise rate of 10° C./min. The amount of heat of the exothermic peak due to the curing reaction was analyzed with an application software "TA-60" appended to TA-60WS and was calculated in terms of J/g.

[Evaluation of Brittleness]

Brittleness was evaluated on the basis of the flexibility as an index.

Each of the sheets obtained in respective Examples was cut to a width of 25 mm and a length of 100 mm. The obtained sheet was lightly pressed against a jig having two plates with an apex angle of 60 degrees corresponding to an apex of an equilateral triangle, and a case where the sheet was not cracked was evaluated as "having flexibility." A case where the sheet was folded by an angle of exactly 180 degrees and was not cracked was evaluated as "being extremely excellent in flexibility."

Synthesis Example 1

Synthesis of the Compound Represented by Formula (III) (X being a Hexamethylene Group, —$(CH_2)_6$—)

In a separable flask equipped with a stirrer, a condenser tube and a nitrogen introduction tube, 19.30 g (0.163 mol) of 1,6-hexanediol (manufactured by Wako Pure Chemical Industries, Ltd.), 45.11 g (0.327 mol) of p-hydroxybenzoic acid (manufactured by Ueno Fine Chemicals Industry, Ltd.), 0.59 g of p-toluenesulfonic acid monohydrate (manufactured by Wako Pure Chemical Industries, Ltd.), 50 ml of diethylene glycol dimethyl ether and 10 ml of xylene were mixed. The separable flask was placed in an oil bath set at 180° C., and the reaction was performed for 5 hours while nitrogen gas was being introduced. Thereafter, under a slightly reduced pressure in the reaction system, the reaction was allowed to proceed while the solvent was being removed little by little, and thus the volatile matter was almost completely removed over a period of 4 hours. A pale brown solid was found to be precipitated in the flask.

The precipitated solid was disintegrated and dissolved in a mixed solvent of isopropanol and tetrahydrofuran; the obtained solution was poured into a large amount of distilled water to remove the catalyst and to precipitate the product. Thereafter, by filtration, the crude product was isolated. The crude product was once more subjected to a sequence of dissolution in the mixed solvent, precipitation and filtration; thereafter, the product was dried in a vacuum oven set at 100° C. for 8 hours to yield 51.51 g of a pale brown powder.

The obtained powder was verified to be the targeted compound represented by formula (III) (X being a hexamethylene group, —$(CH_2)_6$—) on the basis of the fact that in the $^1$H-NMR measurement (deuterium acetone) of the obtained powder, there were found the peaks of COO—$CH_2$—$CH_2$ due to the ester bond formation at chemical shifts of around 4.3 ppm, the peaks of the protons of the benzene ring of hydroxybenzoic acid at chemical shifts of around 6.9 ppm and around 7.9 ppm, and further, the peak of OH of phenol at a chemical shift of around 9.1 ppm, and on the basis of the results of the GPC measurement.

Example 1

21.50 g of the compound represented by formula (III) prepared in Synthesis Example 1, 20.67 g of 4,4'-[1,3-phenylenebis(1-methyl-ethylidene)]bisaniline ("Bisaniline M" manufactured by Mitsui Chemicals, Inc.), 8.26 g of paraformaldehyde (91.6%, manufactured by Mitsubishi Gas Chemical Company, Inc.), 58.3 ml of xylene and 11.7 ml of 1-butanol were mixed and then reacted for 4 hours under refluxing while the generated water was being removed, and thus 91.92 g (solid content concentration: 46.3%) of an amber transparent viscous solution was obtained. A small amount of the solution was sampled to be subjected to the GPC measurement to evaluate the molecular weight; consequently, the number average molecular weight (Mn) was found to be 4,100 and the weight average molecular weight (Mw) was found to be 24,100. The average value of n in formula (I) derived from the Mw was found to be 32.1. Further, a portion of the solution was poured into a large amount of methanol to precipitate the product. Thereafter, the product was separated by filtration, and washed with methanol. The washed product was vacuum-dried in a vacuum oven to yield a pale yellow resin powder.

The obtained resin was verified to be the targeted thermosetting resin on the basis of the fact that the obtained resin was subjected to the $^1$H-NMR measurement (CDCl$_3$), and there were found the peaks due to the benzoxazine ring formation at chemical shifts of around 4.6 ppm and around 5.4 ppm.

Example 2

A coating liquid having a solid content concentration of 40% was prepared by diluting with toluene the thermosetting resin solution obtained in Example 1, cast on a PET film with an applicator, and dried to yield a molded article. The molded article was treated by heating at 180° C. for 3 hours to be cured, and thus a 70 μmt sheet-shaped cured molded article was obtained. The obtained cured molded article was deep orange, transparent and uniform, and excellent in flexibility.

For the obtained sheet, the dielectric constant and the dielectric loss tangent at 23° C. and 5.8 GHz were measured by using a dielectric constant measurement apparatus (trade name "8510C" manufactured by Hewlett-Packard Co.) on the basis of the cavity resonance method. The cured molded article of Example 2 exhibited satisfactory properties both for the dielectric constant and the dielectric loss tangent.

For the obtained sheet, the 5% weight reduction temperature (Td5) was evaluated on the basis of the TGA method by using an apparatus manufactured by Shimadzu Corp., under a trade name of "DTG-60" at a temperature increase rate of 10° C./min in an atmosphere of argon. The cured molded article of Example 2 exhibited a satisfactory Td5 value of 350° C. The measurement results are shown in Table 1.

The exothermic peak due to the curing reaction of the thermosetting resin of Example 1 was 106.7 J/g and the residual exothermic peak of the sheet-shaped cured molded article obtained in Example 2 was 14.5 J/g. Consequently, it was verified that as a result of the heat treatment at 180° C. for 3 hours, 86.4% of the benzoxazine ring in the thermosetting resin was polymerized to cure the thermosetting resin.

Synthesis Example 2

Synthesis of the Compound Represented by Formula (III) (X being a Nonamethylene Group, —(Ch$_2$)$_9$—)

In a separable flask equipped with a stirrer, a condenser tube and a nitrogen introduction tube, 40.00 g (0.25 mol) of 1,9-nonanediol (manufactured by Kuraray Co., Ltd.), 68.95 g (0.50 mol) of p-hydroxybenzoic acid (manufactured by Ueno Fine Chemicals Industry, Ltd.), 1.00 g of p-toluenesulfonic acid monohydrate (manufactured by Wako Pure Chemical Industries, Ltd.) and 200 ml of methyl isobutyl ketone were mixed. The separable flask was placed in an oil bath set at 180° C., and the reaction was performed for 4 hours while nitrogen gas was being introduced. Thereafter, under a slightly reduced pressure in the reaction system, the reaction was allowed to proceed while the solvent was being removed little by little, and thus the volatile matter was almost completely removed over a period of about 4 hours. The reaction solution was cooled to yield a pale brown viscous product.

The viscous product was dissolved in tetrahydrofuran; the obtained solution was poured into a large amount of distilled water to remove the catalyst and the product was separated as a liquid product from the aqueous layer. The aqueous layer was separated by decantation and liquid-liquid separation operation with a separating funnel to isolate the solvent-containing crude product. The crude product was once more subjected to a sequence of dissolution in tetrahydrofuran and precipitation in distilled water; thereafter, the product was dried in a vacuum oven set at 70° C. to yield a pale brown viscous product.

The obtained viscous product was verified to be the targeted compound represented by formula (III) (X being a nonamethylene group, —(CH$_2$)$_9$—) on the basis of the fact that in the $^1$H-NMR measurement (deuterium acetone) of the obtained viscous product, there were found the peaks of COO—CH$_2$—CH$_2$ due to the ester bond formation at chemical shifts of around 4.3 ppm, the peaks of the protons of the benzene ring of hydroxybenzoic acid ester at chemical shifts of around 6.9 ppm and around 7.9 ppm, and further, the peak of OH of phenol at a chemical shift of around 9.1 ppm, and on the basis of the results of the GPC measurement.

Example 3

24.03 g of the compound represented by formula (III) prepared in Synthesis Example 2, 20.67 g of 4,4'-[1,3-phenylenebis(1-methyl-ethylidene)]bisaniline ("Bisaniline M" manufactured by Mitsui Chemicals, Inc.), 8.26 g of paraformaldehyde (91.6%, manufactured by Mitsubishi Gas Chemical Company, Inc.) and 120 ml of toluene were mixed and then reacted for 2 hours under refluxing while the generated water was being removed by azeotropy. The solution was poured into a large amount of methanol to precipitate the product. Thereafter, the product was separated by filtration, and washed with methanol. The washed product was vacuum-dried in a vacuum oven to yield 41.74 g of a pale yellow resin powder. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 4,900 and the weight average molecular weight (Mw) was found to be 16,300. The average value of n in formula (I) derived from the Mw was found to be 20.6.

Example 4

From the thermosetting resin obtained in Example 3, a sheet-shaped cured molded article was obtained in the similar manner as in Example 2. The obtained sheet was orange, transparent and uniform, and extremely excellent in flexibility.

For the obtained sheet, the dielectric constant and the dielectric loss tangent at 23° C. and 5.8 GHz were measured by using a dielectric constant measurement apparatus (trade name "8510C" manufactured by Hewlett-Packard Co.) on the basis of the cavity resonance method. The cured molded article of Example 4 exhibited satisfactory properties both for the dielectric constant and the dielectric loss tangent.

For the obtained sheet, the 5% weight reduction temperature (Td5) was measured on the basis of the TGA method by using an apparatus manufactured by Shimadzu Corp., under a trade name of "DTG-60" at a temperature increase rate of 10° C./min in an atmosphere of argon. The cured molded article of Example 4 exhibited a satisfactory Td5 value of 350° C. The measurement results are shown in Table 1.

Synthesis Example 3

Synthesis of the Compound Represented by Formula (III) (X being a Dodecamethylene Group, —(Ch$_2$)$_{12}$—)

A pale brown solid product was obtained in the similar manner as in Synthesis Example 2 except that 50.59 g (0.25 mol) of 1,12-dodecanediol (manufactured by Ube Industries, Ltd.) was used in place of 1,9-nonanediol in Synthesis Example 2.

The obtained pale brown solid product was verified to be the targeted compound represented by formula (III) (X being a dodecamethylene group, $—(CH_2)_{12}—$) on the basis of the fact that in the $^1$H-NMR measurement (deuterium acetone) of the viscous product, there were found the peaks of COO—C$\underline{H_2}$—CH$_2$ due to the ester bond formation at chemical shifts of around 4.3 ppm, the peaks of the protons of the benzene ring of hydroxybenzoic acid ester at chemical shifts of around 6.9 ppm and around 7.9 ppm, and further, the peak of OH of phenol at a chemical shift of around 9.1 ppm, and on the basis of the results of the GPC measurement.

Example 5

A thermosetting resin was synthesized in the similar manner as in Example 3 except that 26.55 g of the compound represented by formula (III) of Synthesis Example 3 was used in place of the compound represented by formula (III) of Synthesis Example 2, in Example 3. The obtained resin was a pale yellow powder.

The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 4,400 and the weight average molecular weight (Mw) was found to be 11,000. The average value of n in formula (I) derived from the Mw was found to be 13.2.

Example 6

From the thermosetting resin obtained in Example 5, a sheet-shaped cured molded article was obtained in the similar manner as in Example 2. The obtained sheet was orange, transparent and uniform, and extremely excellent in flexibility.

For the obtained sheet, the dielectric constant and the dielectric loss tangent at 23° C. and 5.8 GHz were measured by using a dielectric constant measurement apparatus (trade name "8510C" manufactured by Hewlett-Packard Co.) on the basis of the cavity resonance method. The cured molded article of Example 6 exhibited satisfactory properties both for the dielectric constant and the dielectric loss tangent.

For the obtained sheet, the 5% weight reduction temperature (Td5) was measured on the basis of the TGA method by using an apparatus manufactured by Shimadzu Corp., under a trade name of "DTG-60" at a temperature increase rate of 10° C./min in an atmosphere of argon. The cured molded article of Example 6 exhibited a satisfactory Td5 value of 352° C. The measurement results are shown in Table 1.

Example 7

A thermosetting resin was synthesized in the similar manner as in Example 3 except that 11.66 g (0.06 mol) of 3(4),8 (9)-bis(aminomethyl)tricyclo[5,2,1,0$^{2,6}$]decane ("TCD Diamine" manufactured by Celanese Corp.) was used in place of 4,4'-[1,3-phenylenebis(1-methyl-ethylidene)]bisaniline in Example 3. The obtained resin was a pale yellow powder.

The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.0 ppm and around 4.9 ppm. Furthermore, the GPC measurement was performed to evaluate the molecular weight; consequently, the number average molecular weight (Mn) was found to be 2,700 and the weight average molecular weight (Mw) was found to be 6,700. The average value of n in formula (I) derived from the Mw was found to be 10.4.

Example 8

From the thermosetting resin obtained in Example 7, a sheet-shaped cured molded article was obtained in the similar manner as in Example 2. The obtained sheet was yellow, transparent and uniform, and extremely excellent in flexibility.

For the obtained sheet, the dielectric constant and the dielectric loss tangent at 23° C. and 5.8 GHz were measured. The cured molded article of Example 8 exhibited satisfactory properties both for the dielectric constant and the dielectric loss tangent.

For the obtained sheet, the 5% weight reduction temperature (Td5) was measured on the basis of the TGA method by using an apparatus manufactured by Shimadzu Corp., under a trade name of "DTG-60" at a temperature increase rate of 10° C./min in an atmosphere of air. The cured molded article of Example 8 exhibited a satisfactory Td5 value of 325° C. The measurement results are shown in Table 1.

Synthesis Example 4

Synthesis of the Compound Represented by Formula (III) (X being a Hydrogenated Polybutadiene Group)

In a separable flask equipped with a stirrer, a condenser tube, a water separator and a nitrogen introduction tube, 32.44 g of a hydrogenated product of a hydroxy-terminated liquid butadiene oligomer ("NISSO-PB GI-1000" manufactured by Nippon Soda Co., Ltd., hydroxyl number: 69.2 [KOH mg/g], number average molecular weight (Mn) in terms of monodispersion polystyrene by GPC: 2,380), 6.62 g (0.048 mol) of p-hydroxybenzoic acid (manufactured by Ueno Fine Chemicals Industry, Ltd.), 1.0 g of p-toluenesulfonic acid monohydrate (manufactured by Wako Pure Chemical Industries, Ltd.), 100 ml of diethylene glycol dimethyl ether and 100 ml of toluene were mixed to prepare a homogeneous solution. The separable flask was placed in an oil bath set at 180° C., and the reaction was performed for 4 hours while nitrogen gas was being introduced. During the reaction, the generated water was removed by azeotropy. Thereafter, under a slightly reduced pressure in the reaction system, the reaction was allowed to proceed while the solvent was being removed little by little, and thus the volatile matter was almost completely removed to yield an amber viscous liquid.

The viscous liquid was diluted with 150 ml of toluene, washed with distilled water three times, the aqueous phase was separated, and thereafter toluene was evaporated under a reduced pressure to yield an amber transparent viscous liquid product.

The liquid product was subjected to the GPC measurement, and the number average molecular weight (Mn) was found to be 2,460. The liquid product was verified to be the targeted compound represented by formula (III) (X being a hydrogenated polybutadiene group) on the basis of the fact that in the $^1$H-NMR measurement (deuterium chloroform) of the liquid product, there were found the peaks of COO—CH$_2$—R due to the ester bond formation at chemical shifts of 4.2 to 4.4 ppm and the peaks of the protons of the benzene ring of hydroxybenzoic acid ester at chemical shifts of around 6.9 ppm and around 7.9 ppm.

Example 9

In a glass vessel, 11.19 g of the compound represented by formula (III) in Synthesis Example 4, 2.07 g (0.006 mol) of 4,4'-[1,3-phenylenebis(1-methyl-ethylidene)]bisaniline ("Bisaniline M" manufactured by Mitsui Chemicals, Inc.), 0.83 g of paraformaldehyde (91.6%, manufactured by Mitsubishi Gas Chemical Company, Inc.), 10 ml of toluene and 0.5 ml of isobutanol were mixed. The obtained mixture was heated on a hot plate set at 150° C., and reacted for 4 hours while the generated water was being removed by azeotropy to yield a viscous orange transparent solution. A portion of the solution was vacuum dried at 40° C. to yield a pale yellow rubber-like resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 4,800 and the weight average molecular weight (Mw) was found to be 20,100.

Example 10

From the solution of the thermosetting resin obtained in Example 9, a sheet-shaped cured molded article was obtained in the similar manner as in Example 2. The obtained sheet was orange, transparent and uniform, and extremely excellent in flexibility.

For the obtained sheet, the dielectric constant and the dielectric loss tangent at 23° C. and 5.8 GHz were measured by using a dielectric constant measurement apparatus (trade name "8510C" manufactured by Hewlett-Packard Co.) on the basis of the cavity resonance method. The cured molded article of Example 10 exhibited satisfactory properties both for the dielectric constant and the dielectric loss tangent.

For the obtained sheet, the 5% weight reduction temperature (Td5) was measured on the basis of the TGA method by using an apparatus manufactured by SII Nano Technology Inc., under a trade name of "TG/DTA6200" at a temperature increase rate of 10° C./min in an atmosphere of helium. The cured molded article of Example 10 exhibited a satisfactory Td5 value of 365° C. The measurement results are shown in Table 1.

Synthesis Example 5

Synthesis of the Compound Represented by Formula (III) (X being a Polycarbonate Group)

In a separable flask equipped with a stirrer, a condenser tube, a water separator and a nitrogen introduction tube, 100 g of polycarbonate diol ("Kuraray Polyol C-590" manufactured by Kuraray Co., Ltd., hydroxyl number: 229.1 [KOH mg/g], molecular weight derived from OH number: 490), 59.2 g (0.43 mol) of p-hydroxybenzoic acid (manufactured by Ueno Fine Chemicals Industry, Ltd.), 2.0 g of p-toluenesulfonic acid monohydrate (manufactured by Wako Pure Chemical Industries, Ltd.) and 100 ml of xylene were mixed to prepare a homogeneous solution. The air in the reaction system was replaced with nitrogen, and thereafter the solution was reacted for 3 hours while the solution was being heated in an oil bath set at 180° C. under stirring. During the reaction, the generated water was removed by azeotropy. Thereafter, under a slightly reduced pressure in the reaction system, the reaction was allowed to proceed while the solvent was being removed little by little, and thus the volatile matter was almost completely removed to yield an amber viscous liquid product.

The viscous liquid was diluted with 100 ml of toluene, washed with distilled water several times, the aqueous phase was separated, and thereafter toluene was evaporated under a reduced pressure to yield an amber transparent viscous liquid product.

The liquid product was verified to be the targeted compound represented by formula (III) (X being a polycarbonate group) on the basis of the fact that a portion of the liquid product was dissolved in deuterium chloroform and was subjected to the $^1$H-NMR spectrum measurement, and there were found the peaks of COO—CH$_2$—R due to the ester bond formation at chemical shifts of 4.2 to 4.4 ppm and the peaks of the protons of the benzene ring of hydroxybenzoic acid ester at chemical shifts of around 6.9 ppm and around 7.9 ppm.

Example 11

In a glass vessel, 2.92 g of the compound represented by formula (III) in Synthesis Example 5, 1.38 g (0.004 mol) of α,α'-bis(4-aminophenyl)-1,4-diisopropylbenzene (manufactured by Tokyo Chemical Industry Co., Ltd., the identical compound as 4,4'-[1,4-phenylenebis(1-methyl-ethylidene)] bisaniline), 0.55 g of paraformaldehyde (91.6%, manufactured by Mitsubishi Gas Chemical Company, Inc.), 5 ml of toluene and 1 ml of isobutanol were mixed. The obtained mixture was heated on a hot plate set at 150° C., and reacted for 8 hours while the generated water was being removed by azeotropy to yield a viscous orange transparent solution. A portion of the solution was vacuum dried to yield a pale orange resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 3,800 and the weight average molecular weight (Mw) was found to be 11,500.

Example 12

The solution of the thermosetting resin obtained in Example 11 was diluted with toluene to adjust the viscosity of the solution, and then the solution was applied to a PET film having been subjected to a release treatment and dried at 80° C. for 30 minutes. The film was further treated by heating at 180° C. for 2 hours and thus an 80 μmt sheet-shaped cured molded article was obtained. The obtained sheet was deep orange, transparent and uniform, and extremely excellent in flexibility.

For the obtained sheet, the dielectric constant and the dielectric loss tangent at 1 GHz were measured by using a dielectric constant measurement apparatus (trade name "RF Impedance/Material Analyzer E4991A" manufactured by Agilent Technologies, Inc.) on the basis of the capacity method. The cured molded article of Example 12 exhibited such satisfactory properties as a dielectric constant of 2.8 and a dielectric loss tangent of 0.004.

For the obtained cured molded article, the 5% weight reduction temperature (Td5) was measured on the basis of the TGA method by using an apparatus manufactured by SII Nano Technology Inc., under a trade name of "TG/DTA6200" at a temperature increase rate of 10° C./min in an atmosphere of helium. The cured molded article of Example 12 exhibited a comparatively satisfactory Td5 value of 317° C. The measurement results are shown in Table 2.

Synthesis Example 6

Synthesis of the Compound Represented by Formula (III) (X being —$CH_2CH_2OC_6H_4C(CH_3)_2C_6H_4OCH_2CH_2$—)

In a separable flask equipped with a stirrer, a condenser tube, a water separator and a nitrogen introduction tube, 50.0 g of bisphenol A-ethylene oxide 2 mol adduct ("BA-2 Glycol" manufactured by Nippon Nyukazai Co., Ltd., hydroxyl number: 345 [KOH mg/g]), 43.7 g (0.32 mol) of p-hydroxybenzoic acid (manufactured by Ueno Fine Chemicals Industry, Ltd.), 1.0 g of p-toluenesulfonic acid monohydrate (manufactured by Wako Pure Chemical Industries, Ltd.), 80 ml of diethylene glycol dimethyl ether and 80 ml of toluene were mixed to prepare a homogeneous solution. The air in the reaction system was replaced with nitrogen, and thereafter the solution was reacted for 1 hour while the solution was being heated in an oil bath set at 150° C. under stirring. While, during the reaction, the generated water was being removed by azeotropy, the reaction was allowed to proceed by stepwise increasing the temperature to 190° C. to yield a red purple solution.

From the solution the solvent was evaporated under a reduced pressure, and thereafter the content of the solution was dissolved in chloroform. A small amount of the insoluble matter was removed by filtration, and then the solution was washed with ion-exchanged water and dried with anhydrous sodium sulfate. Further, under a reduced pressure, chloroform was evaporated to yield a pale purple solid.

The solid was verified to be the targeted compound represented by formula (III) (X being a 2,2-bis[4-(2-ethoxy)phenyl]propane group, —$CH_2CH_2OC_6H_4C(CH_3)_2C_6H_4OCH_2CH_2$—) on the basis of the fact that a portion of the solid was dissolved in deuterium chloroform and was subjected to the $^1$H-NMR spectrum measurement, and there were found the peaks of COO—$CH_2$—$CH_2$ due to the ester bond formation at chemical shifts of around 4.3 ppm and the peaks of the protons of the benzene ring of hydroxybenzoic acid ester at chemical shifts of around 6.8 ppm and around 7.9 ppm.

Example 13

In a glass vessel, 2.23 g of the compound represented by formula (III) in Synthesis Example 6, 2.07 g (0.004 mol) of 2,2-bis[4-(4-aminophenoxy)phenyl]hexafluoropropane (manufactured by Central Glass Co., Ltd.), 0.55 g of paraformaldehyde (91.6%, manufactured by Mitsubishi Gas Chemical Company, Inc.), 8 ml of toluene and 2 ml of isobutanol were mixed. The obtained mixture was heated on a hot plate set at 150° C., and reacted for 8 hours while the generated water was being removed by azeotropy to yield a viscous yellow transparent solution. A portion of the solution was vacuum dried to yield a pale yellow resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 2,300 and the weight average molecular weight (Mw) was found to be 4,700.

Example 14

The solution of the thermosetting resin obtained in Example 13 was applied to a PET film having been subjected to a release treatment and dried at 80° C. for 30 minutes. The film was further treated by heating at 180° C. for 2 hours and thus a 100 μmt sheet-shaped cured molded article was obtained. The obtained sheet was deep orange, transparent and uniform, and had flexibility.

For the obtained sheet, the dielectric constant and the dielectric loss tangent at 1 GHz were measured in the similar manner as in Example 12. The cured molded article of Example 14 exhibited such satisfactory properties as a dielectric constant of 2.5 and a dielectric loss tangent of 0.008. For the obtained cured molded article, the 5% weight reduction temperature (Td5) was measured in the similar manner as in Example 12. The cured molded article of Example 14 exhibited a satisfactory Td5 value of 344° C. The measurement results are shown in Table 2.

Synthesis Example 7

Synthesis of the Compound Represented by Formula (III) (X being a Hydrogenated Polybutadiene Group)

In a separable flask equipped with a stirrer, a condenser tube, a water separator and a nitrogen introduction tube, 612 g of the same hydrogenated product of a hydroxy-terminated liquid butadiene oligomer as used in Synthesis Example 4, 111 g (0.80 mol) of p-hydroxybenzoic acid (manufactured by Ueno Fine Chemicals Industry, Ltd.), 63 g of activated clay (manufactured by Wako Pure Chemical Industries, Ltd.) and 1100 ml of xylene were mixed. The air in the reaction system was replaced with nitrogen, thereafter the obtained mixture was heated in an oil bath set at 180° C., and the reaction was allowed to proceed for 10 hours under stirring. During the reaction, the generated water was removed by azeotropy.

The solution after the completion of the reaction was cooled and then diluted with 900 ml of toluene, and the activated clay was filtered off to yield a faintly yellow solution. Further, under a reduced pressure, toluene was evaporated to yield a faintly yellow transparent viscous liquid product.

The liquid product was verified to be the targeted compound represented by formula (III) (X being a hydrogenated polybutadiene group) on the basis of the fact that a portion of the liquid product was dissolved in deuterium chloroform and was subjected to the $^1$H-NMR spectrum measurement, and there were found the peaks of COO—$CH_2$—R due to the ester bond formation at chemical shifts of 4.2 to 4.4 ppm and the peaks of the protons of the benzene ring of hydroxybenzoic acid ester at chemical shifts of around 6.9 ppm and around 7.9 ppm.

Example 15

In a glass vessel, 7.46 g of the compound represented by formula (III) in Synthesis Example 7, 0.79 g (0.004 mol) of 4,4'-diaminodiphenylmethane (manufactured by Wako Pure Chemical Industries, Ltd.), 0.55 g of paraformaldehyde (91.6%, manufactured by Mitsubishi Gas Chemical Company, Inc.), 8 ml of toluene and 2 ml of isobutanol were mixed. The obtained mixture was heated on a hot plate set at 140° C., and reacted for 8 hours while the generated water was being removed by azeotropy to yield a viscous yellow transparent solution. A portion of the solution was taken and was dried by evaporating the solvent under a reduced pressure to yield a rubber-like resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Furthermore, the GPC measurement was performed to evaluate the molecular weight; consequently, the number average molecular weight (Mn) was found to be 4,500 and the weight average molecular weight (Mw) was found to be 10,800.

Example 16

The solution of the thermosetting resin obtained in Example 15 was applied to a PET film having been subjected to a release treatment and dried at 80° C. for 30 minutes. The film was further treated by heating at 180° C. for 2 hours and thus a 110 μmt sheet-shaped cured molded article was obtained. The obtained sheet was deep orange, transparent and uniform, and extremely excellent in flexibility.

For the obtained sheet, the dielectric constant and the dielectric loss tangent at 1 GHz were measured in the similar manner as in Example 12. The cured molded article of Example 16 exhibited such extremely satisfactory properties as a dielectric constant of 2.2 and a dielectric loss tangent of 0.001.

For the obtained sheet, the 5% weight reduction temperature (Td5) was measured in the similar manner as in Example 12. The cured molded article of Example 16 exhibited a satisfactory Td5 value of 380° C. The measurement results are shown in Table 1.

Example 17

A viscous red transparent solution was obtained by conducting the reaction in the similar manner as in Example 15 except that 4,4'-diaminodiphenylmethane in Example 15 was altered to 0.91 g (0.004 mol) of 4,4'-diamino-3,3'-dimethyl-diphenylmethane (manufactured by Wako Pure Chemical Industries, Ltd.). A portion of the solution was taken and was dried by evaporating the solvent under a reduced pressure to yield a rubber-like resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.4 ppm and around 5.2 ppm. Additionally, the GPC measurement was performed to evaluate the molecular weight; consequently, the number average molecular weight (Mn) was found to be 5,500 and the weight average molecular weight (Mw) was found to be 12,400.

Example 18

The solution of the thermosetting resin obtained in Example 17 was applied to a PET film having been subjected to a release treatment and dried at 80° C. for 30 minutes. The film was further treated by heating at 180° C. for 2 hours and thus a 100 μmt sheet-shaped cured molded article was obtained. The obtained cured article was deep orange, transparent and uniform, and extremely excellent in flexibility.

For the obtained molded article, the dielectric constant and the dielectric loss tangent at 1 GHz were measured in the similar manner as in Example 12. The cured molded article of Example 18 exhibited such extremely satisfactory properties as a dielectric constant of 2.2 and a dielectric loss tangent of 0.001.

Furthermore, for the obtained cured molded article, the 5% weight reduction temperature (Td5) was measured in the similar manner as in Example 12. The cured molded article of Example 18 exhibited a satisfactory Td5 value of 380° C. The measurement results are shown in Table 2.

Example 19

A viscous yellow transparent solution was obtained by conducting the reaction in the similar manner as in Example 15 except that 4,4'-diaminodiphenylmethane in Example 15 was altered to 1.64 g (0.004 mol) of 2,2-bis[4-(4-aminophenoxy) phenyl]propane (manufactured by Wakayama Seika Kogyo Co., Ltd.). A portion of the solution was taken and was dried by evaporating the solvent under a reduced pressure to yield a rubber-like resin. The obtained resin was verified to be the targeted thermosetting resin on the basis of the fact that the obtained resin was subjected to the $^1$H-NMR measurement in deuterium chloroform, and there were found the peaks due to the benzoxazine ring formation at chemical shifts of around 4.6 ppm and around 5.4 ppm. Additionally, the GPC measurement was performed to evaluate the molecular weight; consequently, the number average molecular weight (Mn) was found to be 4,400 and the weight average molecular weight (Mw) was found to be 9,600.

Example 20

The solution of the thermosetting resin obtained in Example 19 was applied to a PET film having been subjected to a release treatment and dried at 80° C. for 30 minutes. The film was further treated by heating at 180° C. for 2 hours and thus a 110 μmt sheet-shaped cured molded article was obtained. The obtained cured article was deep orange, transparent and uniform, and extremely excellent in flexibility.

For the obtained sheet, the dielectric constant and the dielectric loss tangent at 1 GHz were measured in the similar manner as in Example 12. The cured molded article of Example 20 exhibited such extremely satisfactory properties as a dielectric constant of 2.2 and a dielectric loss tangent of 0.001.

Furthermore, for the obtained sheet, the 5% weight reduction temperature (Td5) was evaluated in the similar manner as in Example 12. The cured molded article of Example 20 exhibited a satisfactory Td5 value of 386° C. The measurement results are shown in Table 2.

TABLE 1

| | 5.8 GHz | | |
|---|---|---|---|
| | Dielectric constant | Dielectric loss tangent | Td5 |
| Example 2 | 2.85 | 0.0065 | 350° C. |
| Example 4 | 2.83 | 0.0057 | 350° C. |
| Example 6 | 2.78 | 0.0057 | 352° C. |
| Example 8 | 3.04 | 0.0084 | 325° C. |
| Example 10 | 2.4 | 0.002 | 365° C. |

TABLE 2

|  | 1 GHz | | |
|---|---|---|---|
|  | Dielectric constant | Dielectric loss tangent | Td5 |
| Example 12 | 2.8 | 0.004 | 317° C. |
| Example 14 | 2.5 | 0.008 | 344° C. |
| Example 16 | 2.2 | 0.001 | 380° C. |
| Example 18 | 2.2 | 0.001 | 380° C. |
| Example 20 | 2.2 | 0.001 | 386° C. |

For example, resin materials for multilayer substrates to constitute packages of ICs such as memories and logical processors are required to have, as the properties at ambient temperature of 23° C. and at 100 MHz, 1 GHz, 2.4 GHz and 5.8 GHz, the dielectric constant of 3.5 or less and the dielectric loss under the same conditions of 0.015 or less in terms of the dielectric loss tangent value as the index of the dielectric loss.

The thermosetting resins having a benzoxazine structure of Examples of the present invention all have excellent dielectric properties.

Industrial Applicability

The present invention provides a thermosetting resin that is excellent in heat resistance and satisfactory in electrical properties, and that is significantly improved in brittleness, and a method for producing the thermosetting resin. The thermosetting resin has industrial applicability as compositions comprising the thermosetting resin, molded articles, cured articles and cured molded articles of the compositions; and electronic devices comprising these materials.

The invention claimed is:

1. A thermosetting resin having a benzoxazine structure represented by the following formula (I):

formula (I):

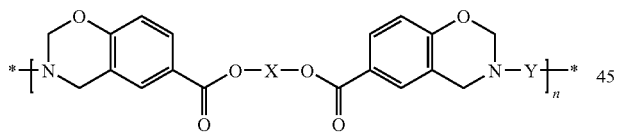

wherein in formula (I): X is a residue of a diol compound having a molecular weight or a number average molecular weight in terms of polystyrene measured by GPC of 5,000 or less, wherein the diol compound is selected from the group consisting of hydroxy-terminated polybutadiene, hydroxy-terminated polyisoprene, hydrogenated products of hydroxy-terminated polybutadiene and hydroxy-terminated polyisoprene, polyolefin polyol, and polycarbonate diol; Y is a residue of a diamine compound; and n is an integer of 2 to 200.

2. The thermosetting resin having the benzoxazine structure according to claim 1, wherein Y is a residue of an aromatic diamine compound or an alicyclic diamine compound.

3. The thermosetting resin having the benzoxazine structure according to claim 1, wherein Y is a residue of an aromatic diamine compound represented by the following formula (II):

formula (II):

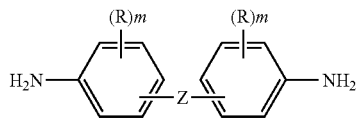

wherein in formula (II): R is an organic group having no active hydrogen and having 1 to 6 carbon atoms; the organic group may include an oxygen atom and a nitrogen atom; m represents an integer of 0 to 4; and z is a direct bond or at least one group selected from the following group A:

group A:

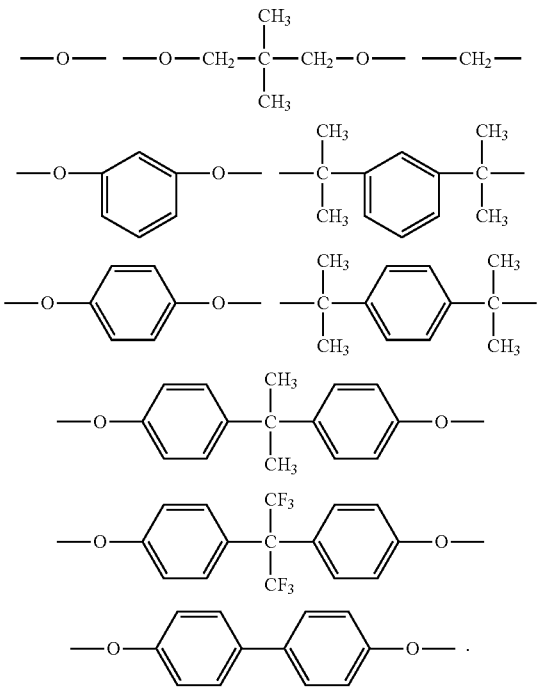

4. The thermosetting resin having the benzoxazine structure according to claim 1, wherein Y is a residue of a saturated bridged cyclic diamine compound selected from the following group B:

group B:

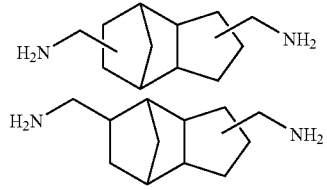

5. A thermosetting resin having the benzoxazine structure produced by reacting by heating a) a compound represented by the following formula (III), b) a diamine compound, and c) an aldehyde compound:

formula (III):

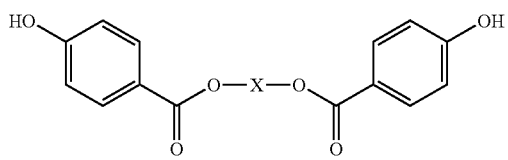

wherein in formula (III), X is a residue of a diol compound having a molecular weight or a number average molecular weight in terms of polystyrene measured by GPC of 5,000 or less, wherein the diol compound is selected from the group consisting of hydroxy-terminated polybutadiene, hydroxy-terminated polyisoprene, hydrogenated products of hydroxy-terminated polybutadiene and hydroxy-terminated polyisoprene, polyolefin polyol, and polycarbonate diol.

6. A method for producing the thermosetting resin having the benzoxazine structure according to claim 1 comprising:
reacting by heating a) a compound represented by the following formula (III), b) a diamine compound, and c) an aldehyde compound formula (III):

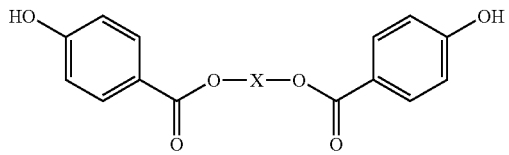

wherein in formula (III), X is a residue of a diol compound having a molecular weight or a number average molecular weight in terms of polystyrene measured by GPC of 5,000 or less.

7. A thermosetting composition comprising at least the thermosetting resin having the benzoxazine structure according to claim 1 or a thermosetting resin having a benzoxazine structure produced by a production method which comprises:
reacting by heating a) a compound represented by the following formula (III), b) a diamine compound, and c) an aldehyde compound formula (III):

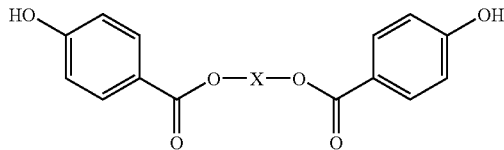

wherein in formula (III), X is a residue of a diol compound having a molecular weight or a number average molecular weight in terms of polystyrene measured by GPC of 5,000 or less, wherein the diol compound is selected from the group consisting of hydroxy-terminated polybutadiene, hydroxy-terminated polyisoprene, hydrogenated products of hydroxy-terminated polybutadiene and hydroxy-terminated polyisoprene, polyolefin polyol, and polycarbonate diol.

8. The thermosetting composition according to claim 7, further comprising a compound having in the molecule thereof at least one benzoxazine structure.

9. A molded article obtained from the thermosetting resin having the benzoxazine structure according to claim 1, the thermosetting resin having the benzoxazine structure produced by a production method which comprises:
reacting by heating a) a compound represented by the following formula (III), b) a diamine compound, and c) an aldehyde compound formula (III):

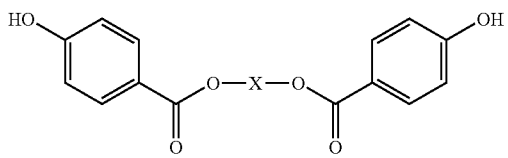

wherein in formula (III), X is a residue of a diol compound having a molecular weight or a number average molecular weight in terms of polystyrene measured by GPC of 5,000 or less.

10. A molded article obtained from the thermosetting composition according to claim 7.

11. A cured article obtained from the thermosetting resin having the benzoxazine structure according to claim 1, the thermosetting resin having the benzoxazine structure produced by a production method which comprises:
reacting by heating a) a compound represented by the following formula (III), b) a diamine compound, and c) an aldehyde compound formula (III):

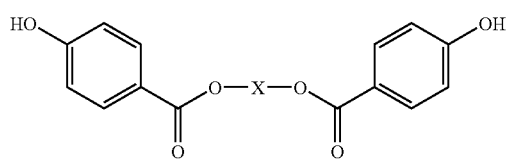

wherein in formula (III), X is a residue of a diol compound having a molecular weight or a number average molecular weight in terms of polystyrene measured by GPC of 5,000 or less.

12. A cured article obtained from the thermosetting composition according to claim 7.

13. A cured molded article obtained by curing the molded article according to claim 9.

14. A cured molded article obtained by curing the molded article according to claim 10.

15. An electronic device comprising the molded article according to claim 9.

16. An electronic device comprising the molded article according to claim 10.

17. An electronic device comprising the cured article according to claim 11.

18. An electronic device comprising the cured article according to claim 12.

19. An electronic device comprising the cured molded article according to claim 13.

20. An electronic device comprising the cured molded article according to claim 14.

* * * * *